US011155134B1

(12) United States Patent
Alalouf

(10) Patent No.: US 11,155,134 B1
(45) Date of Patent: *Oct. 26, 2021

(54) PROTECTIVE COVER AND ORGANIZER FOR TRAILER TONGUE JACK

(71) Applicant: Trailersphere Corporation, Kirkland, WA (US)

(72) Inventor: Avraham Alalouf, Kirkland, WA (US)

(73) Assignee: Trailersphere Corporation, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,564

(22) Filed: Nov. 19, 2018

Related U.S. Application Data

(60) Provisional application No. 62/588,888, filed on Nov. 20, 2017, provisional application No. 62/648,713, filed on Mar. 27, 2018.

(51) Int. Cl.
*B60D 1/60* (2006.01)
*B60D 1/66* (2006.01)

(52) U.S. Cl.
CPC ............... *B60D 1/605* (2013.01); *B60D 1/66* (2013.01)

(58) Field of Classification Search
CPC . B60D 1/605; B60D 1/66; B60D 1/01; B60D 1/60; B60D 1/187
See application file for complete search history.

(56) References Cited

U.S. PATENT DOCUMENTS

| 3,298,712 | A  | * | 1/1967 | Greenstadt | B25H 5/00 280/770 |
| 7,883,103 | B1 | * | 2/2011 | Greaves, Jr. | B60D 1/60 280/507 |
| 9,963,079 | B2 | * | 5/2018 | Hack | B60D 1/58 |
| 2006/0061064 | A1 | * | 3/2006 | Johnson | B60D 1/60 280/507 |
| 2021/0008938 | A1 | * | 1/2021 | Ousley | B60S 9/02 |

OTHER PUBLICATIONS https://www.amazon.com/dp/B071CWJ561/ref=psdc_155314011_t4_B07VNNFLPM; Universal RV Travel Trailer Electric Tongue Jack Cover "Sun-DURA" by Carver Industries (Year: 2017).*
https://www.amazon.com/Scarleton-Large-Drawstring-Handbag-H107821/dp/B00DD73HXY/ref=sr_1_154?dchild=1&keywords=bucket+purse&qid=1611970777&sr=8-154, Scarleton Large Bucket Bag for Women, Faux Leather Hobo Bag, Should Bay, Crossbody Bag, Feb. 28, 2011 (Year: 2011).*

* cited by examiner

*Primary Examiner* — Minnah L Seoh
*Assistant Examiner* — Harold Eric Pahlck, III

(57) ABSTRACT

A protective apparatus for a trailer tongue jack having a head and a column may include a protective cover having a shape that substantially conforms to the shape of the head, and an opening to accommodate the column when the protective cover is placed on the jack. First and second hook holders may be adapted to connect hooks for first and second trailer safety chains to the protective cover when the chains are not in use. A plug holder may be adapted to hold a plug for a trailer wiring harness when the harness is not in use. The protective cover may include an access port that aligns with a user interface on the jack when the protective cover is placed on the jack.

9 Claims, 43 Drawing Sheets

Front

Left

Rear

Top

PROTECTIVE COVER AND ORGANIZER FOR TRAILER TONGUE JACK

CROSS-REFERENCE TO RELATED APPLICATIONS

This application claims priority from U.S. Provisional Patent Application Ser. No. 62/588,888 filed Nov. 20, 2017 which is incorporated by reference, and U.S. Provisional Patent Application Ser. No. 62/648,713 filed Mar. 27, 2018 which is incorporated by reference.

BACKGROUND

A trailer, such as a travel trailer, boat trailer, utility trailer, etc., usually has a tongue portion at the front of the trailer with a coupling that connects the trailer to a hitch on the towing vehicle. Safety chains are typically attached permanently to the tongue at one end of each chain and have hooks at the other ends of the chains to removably connect the chains to the hitch. An electrical wiring harness is typically hard-wired to the trailer tongue at one end and includes a plug at the other end to removably connect the harness to an electrical connector on the towing vehicle. These chains and harnesses present a storage and clutter problem when the trailer is not in use.

One proposed solution to the storage problem is disclosed in U.S. Patent Application Publication No. 2006/0061064 which discloses a protective cover for a trailer tongue. The cover is essentially a bag that fits over the coupling and part of the tongue and allows the user to insert the safety chains and wiring harness in the bag. Placing everything in a bag, however, is not a satisfactory solution. The chains and/or harness can become tangled in the bag, and moreover, it does not provide a sense or organization.

Another aspect of trailer storage relates to tongue jacks. Most trailers have a tongue jack with an extendable column that raises or lowers the trailer tongue to facilitate coupling the trailer to the towing vehicle, and also enabling the trailer to be leveled when it is parked. Some tongue jacks have manually operated cranks to raise and lower the tongue, while others have electric or pneumatic motors. An electric tongue jack typically has a head with one or more motors, actuators, buttons, switches, displays, lights, etc. at the top of the extendable column.

In recent years, electric tongue jacks have become more sophisticated, functional, and stylized. An example of such a jack is shown in FIG. 1 which illustrates a Smart Jack by Lippert Components, Inc., (LCI). The jack 10 of FIG. 1 includes a power head 12 that contains a motorized lift mechanism, a telescoping support column 14, a flange 16 to attach the jack to the frame of a trailer, and an adjustable foot 18. The power head 12 has an electronic control panel 20 that includes buttons and displays for controlling the operation of the jack.

In addition to functionality, these jacks provide their owners with a sense of enjoyment and pride in the fine design and fabrication that goes into these devices. They can be very expensive, and owners may therefore want to preserve and display their investment.

SUMMARY

The inventive principles of this patent disclosure are directed to solving multiple problems relating to the storage and protection of the apparatus associated with trailer tongues. One aspect of the inventive principles is a cover that protects a trailer tongue jack, especially the head portion, which may have exposed components that are vulnerable to weather, accidents, vandalism, etc. In some embodiments, the cover may be shaped to conform to the head of the jack, and may also include additional features such as access ports that enable a user to manipulate controls on the jack even while the cover is in place.

In accordance with the inventive principles, however, it was also realized that the location of a jack head, which is elevated above the trailer tongue, provides an ideal point from which to hang the safety chains and/or wiring harness when they are not in use. Thus, a protective cover may include one or more attachment points for holding plugs, chain hooks, etc. The height of the cover above the trailer tongue helps keep the chains and harness well off the ground. Not only is this a functional and synergistic solution for protecting the jack while storing and organizing the chains and harness, but there is an inherent satisfaction in the way the chains and harness drape from the cover. Customers of commercial embodiments have expressed surprise and delight with the pleasing results. These and additional features are described in more detail below.

DETAILED DESCRIPTION

Figure 2:
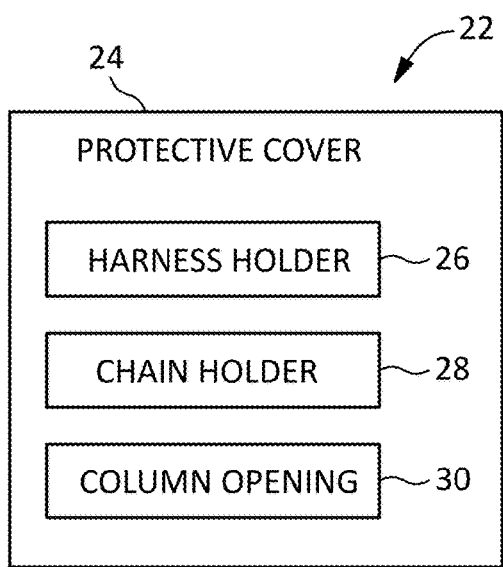
FIG. 2 is a schematic block diagram of an embodiment of a protective cover and organizer for a trailer tongue jack having a head and a column according to some inventive principles of this patent disclosure.

FIG. 2 is a schematic block diagram of an embodiment of a protective cover and organizer for a trailer tongue jack having a head and a column according to some inventive principles of this patent disclosure. The apparatus 22 of FIG. 2 includes a protective cover 24 having an opening 30 to accommodate the column when the protective cover is placed on the jack, a chain holder 28 adapted to hold a trailer safety chain when the chain is not in use, and a harness holder 26 adapted to hold a trailer wiring harness when the harness is not in use. The protective cover 22 may be adapted to cinch the opening 30 around the column to secure the protective cover to the jack. If used with a manual jack having a crank for raising and lowering the trailer tongue jack, the protective cover may be adapted to cinch the opening around the column and the crank.

Figure 3:
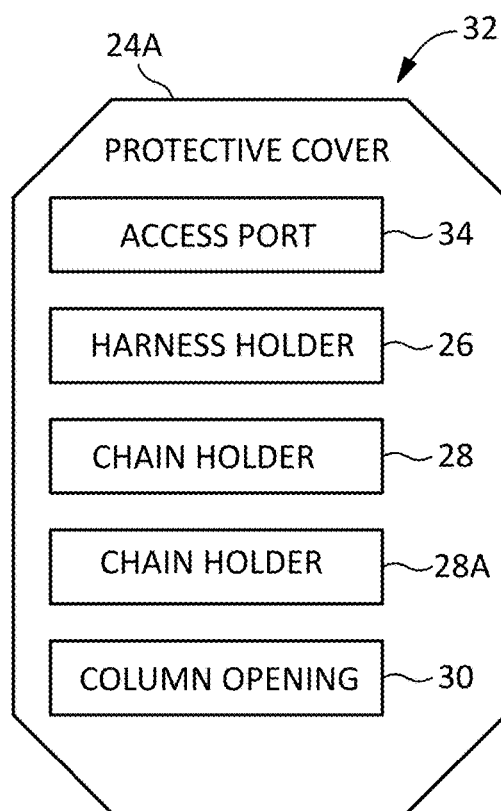
FIG. 3 is a schematic block diagram of another embodiment of a protective cover and organizer for a trailer tongue jack having a head and a column according to some inventive principles of this patent disclosure.

FIG. 3 is a schematic block diagram of another embodiment of a protective cover and organizer for a trailer tongue jack having a head and a column according to some inventive principles of this patent disclosure. The apparatus 32 of FIG. 3 includes a protective cover 24A, opening 30, chain holder 28 and harness holder 26 similar to those in the embodiment of FIG. 2. The apparatus 32 of FIG. 3, however, also includes a second chain holder 28A adapted to hold a second trailer safety chain when the second chain is not in use, and an access port 34 that aligns with a user interface on the jack when the protective cover is placed on the head. The user interface on the jack may include buttons, switches, displays, lights, etc., for monitoring and controlling the jack. The protective cover 24A may have a shape that substantially conforms to the shape of the head when the protective cover is placed on the jack. In FIG. 3, the shape of the protective cover 24A is shown symbolically as an octagon to indicate that cover has some type of purposeful shape, but in a practical implementation, the shape may conform to the shape of a commercially available tongue such as the Smart Jack mentioned above, an LCI X5, or jacks from Atwood, FIC, Stromberg Carlson, etc.

Figure 4:
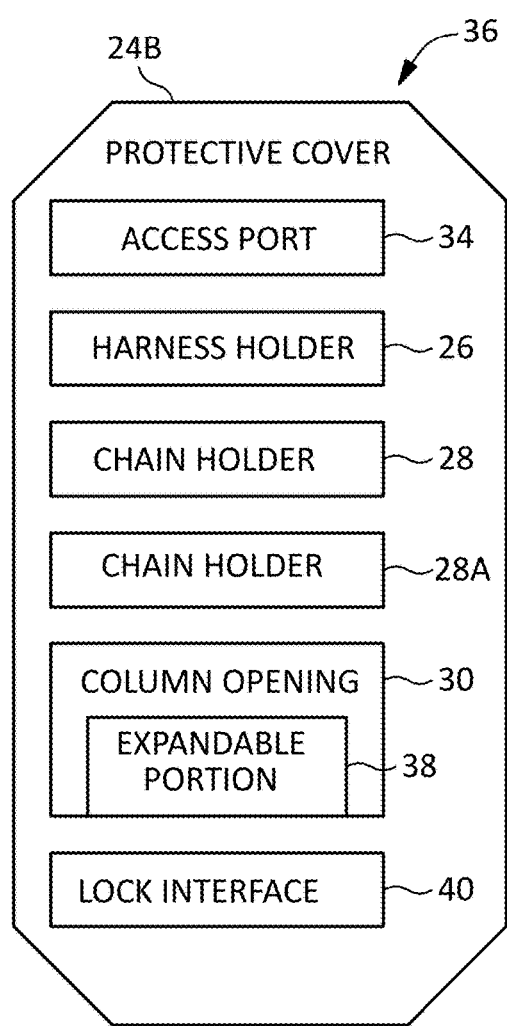
FIG. 4 is a schematic block diagram of another embodiment of a protective cover and organizer for a trailer tongue jack having a head and a column according to some inventive principles of this patent disclosure.

FIG. 4 is a schematic block diagram of another embodiment of a protective cover and organizer for a trailer tongue jack having a head and a column according to some inventive principles of this patent disclosure. The apparatus 36 of FIG. 4 includes the features of the embodiment of FIG. 3, but further includes a lock interface 40 to enable the use of a lock to prevent removal of the protective cover from the jack. In the embodiment of FIG. 4, the opening 30 of the protective cover 24B includes an expandable portion 38 arranged to widen the opening to facilitate placement of the protective cover over the head, and then narrow the opening to hold the protective cover snugly over the head.

Some additional features according to the inventive principles of this patent disclosure are summarized here and described in more detail further below. The hook holders may be arranged to hold the hooks below the protective cover. For example, the hook holders may include rings, such as D-rings that are attached to the protective cover by straps. Fastening devices such as snaps may be arranged to secure the hook holders to the protective cover when the hook holders are not in use. A harness holder may be implemented as a pouch having a drawstring to secure a plug on the harness in the pouch.

In some embodiments, the access port may be implemented as a window that is fabricated, for example, with a flexible transparent material that enables the user to see and operate push buttons and rocker switches through the material so that the jack remains protected even while operating. In other embodiments, the access port may be implemented as a flap that can be opened to allow the user to operate toggle switches. The flap may be closed with a zipper, hook-and-loop fasteners, or other closure mechanism when not in use.

In embodiments in which the column opening has an expandable portion, it may be implemented with a zipper, hook-and-loop fastener, or other closure mechanism. In some embodiments, the entire opening itself may be expandable, for example, by fabricating it with a drawstring to cinch the cover closed around the column.

In embodiments having a lock interface, two gromets may be used to receive the hasp of a padlock. One of the gromets may be attached directly to the protective cover while the other gromet is attached to the protective cover by a strap.

Various other access ports may be provided in the cover. For example, the cover may include a second access port such as a flap or window that aligns with a level on the jack. As another example, an access port may be aligned with a manual actuator that enables the jack to be operated in the event of power loss.

Figure 5:
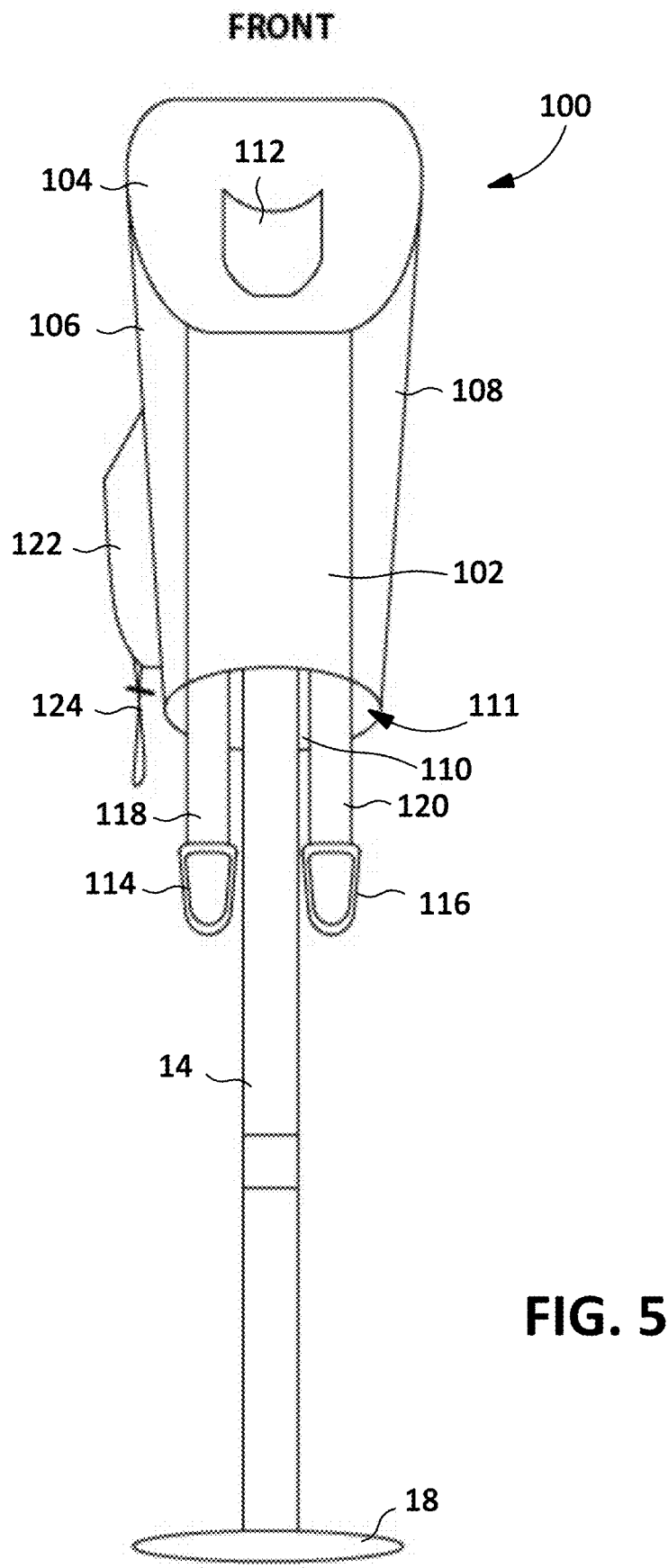
FIG. 5 is a front view of an embodiment of a protective cover according to the inventive principles of this patent disclosure.

FIG. 5 is a front view of an embodiment of a protective cover 100 according to the inventive principles of this patent disclosure. The cover 100 in this embodiment is essentially a sewn product made from panels of vinyl, canvas, nylon or any other suitable material. In other embodiments, the cover may be fabricated through other processes such as knitting, weaving, gluing, molding, etc. The embodiment of FIG. 5 includes a front panel 102, a top panel 104, a right side panel 106, a left side panel 108, and a back panel 110. The cover 100 is designed to fit over the jack 10 of FIG. 1 as shown in FIG. 5 where the support column 14 and foot 18 of the jack are visible. The column opening 111 in the protective cover 100 is visible in this view. The cover may be made from fewer or more panels and some panels may be fabricated using sub-panels.

Figure 1:
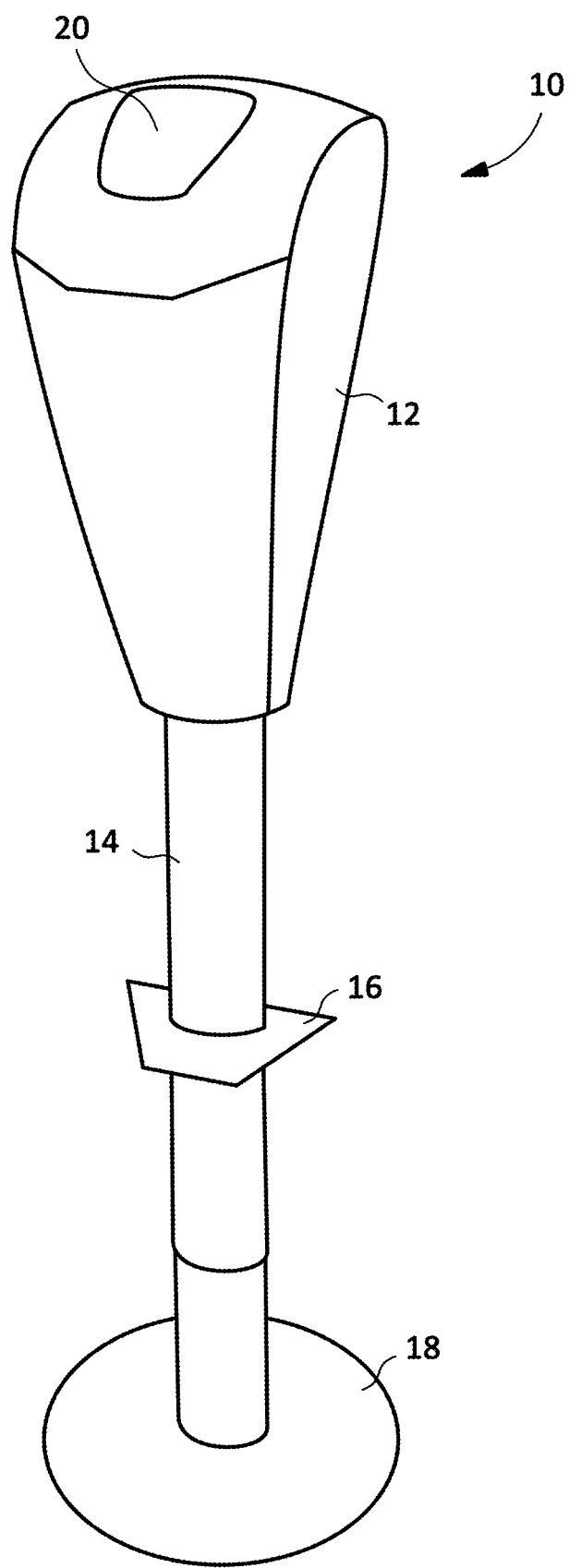
FIG. 1 is an oblique front view of an example of a commercially available power tongue jack that may be used to automatically raise and lower the tongue of a trailer.

The top panel 104 includes a window 112 made from a transparent material that is aligned with the control panel 20 of the jack 10 shown in FIG. 1 and preferably made from a material that is flexible enough to allow a user to manipulate the controls through the window.

Two D-rings 114 and 116 are attached to the cover 100 with straps 118 and 120 to provide convenient storage for trailer chains by allowing chain hooks to be attached to the D-rings 114 and 116. In other embodiments, the D-rings may be replaced with metal O-rings and/or attached directly to the front panel 102 or any other panel. In yet other embodiments, the rings may be replaced with loops of webbing, cord or other suitable material. Alternatively, storage attachment points for chain hooks may be implemented with holes in the front panel 102 or any other panel and reinforced with grommets or any other type of reinforcement.

A pocket or pouch 122 is attached to the right side panel 106 and is designed to hold and protect an electrical connector for the trailer. The pocket 122 may be fabricated from the same material as the panels and in this embodiment includes a drawstring closure 124 hold the connector securely in the pocket. Other types of closure mechanisms may be used such as snaps, elastic, hook-and-loop fasteners, etc.

Figure 6:
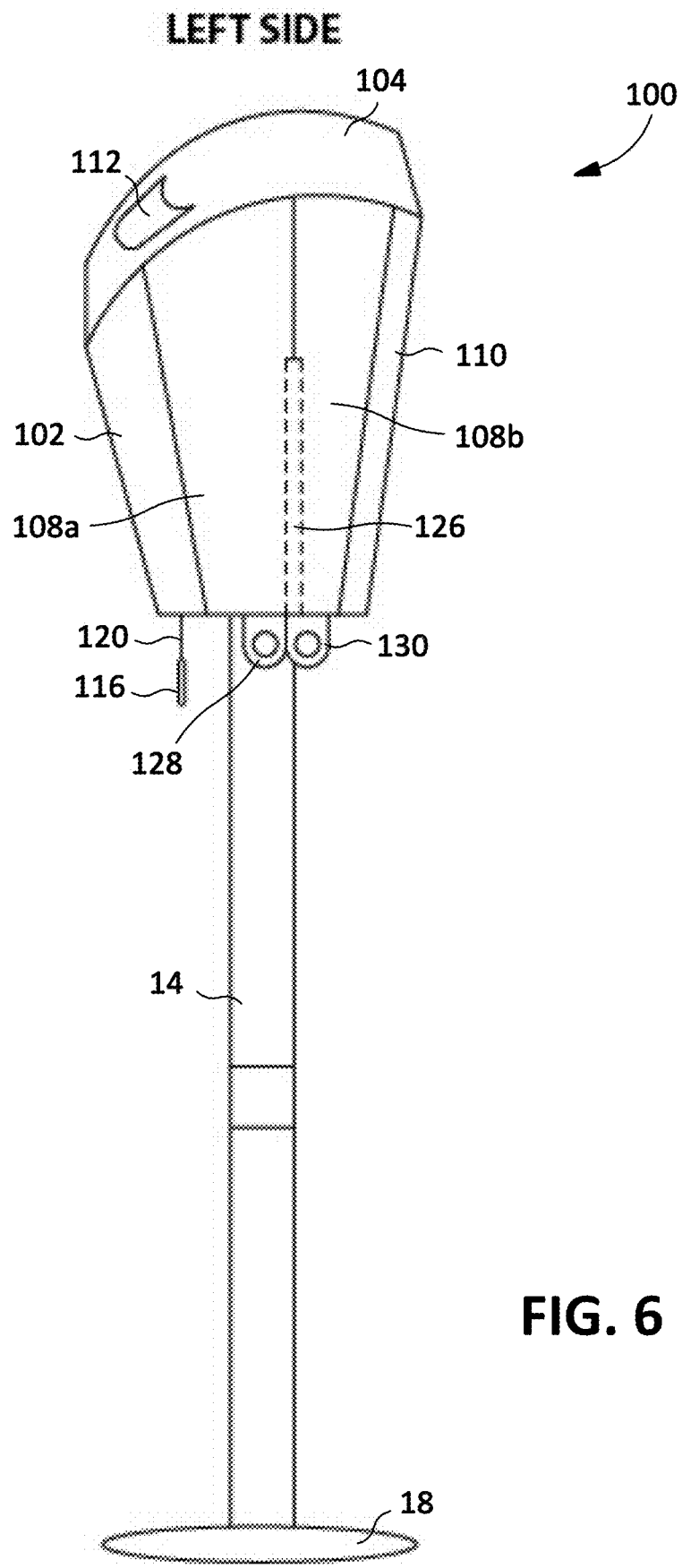
FIG. 6 is a left side view of the embodiment of the protective cover of FIG. 5 according to the inventive principles of this patent disclosure.

FIG. 6 is a left side view of the embodiment of the protective cover 100 according to the inventive principles of this patent disclosure. In this view it can be seen that the left side panel 108 is fabricated with front and back subpanels 108a and 108b, respectively. A portion of the front and back subpanels 108a and 108b are connected at a juncture 126 which allows the bottom of the cover 100 to spread open to fit over the jack 10 but then close back up to provide a tight fit over the jack once in place. The front and back subpanels 108a and 108b may include Velcro hook-and-loop fasteners, a zipper, snaps, or any other suitable closure mechanism to removably join the subpanels together at the juncture 126.

Each of the front and back subpanels 108a and 108b includes a loop 128 and 130, respectively, that may be used as a convenience or safety feature to secure or lock the cover 100 in place over the jack. For example, each loop may be fabricated from a tab of the material used for the panels and reinforced with a grommet. The hasp of a padlock may then be inserted through the loops 128 and 130 and latched closed to lock the cover in place, thereby preventing theft or discouraging vandalism of the jack.

Figure 7:
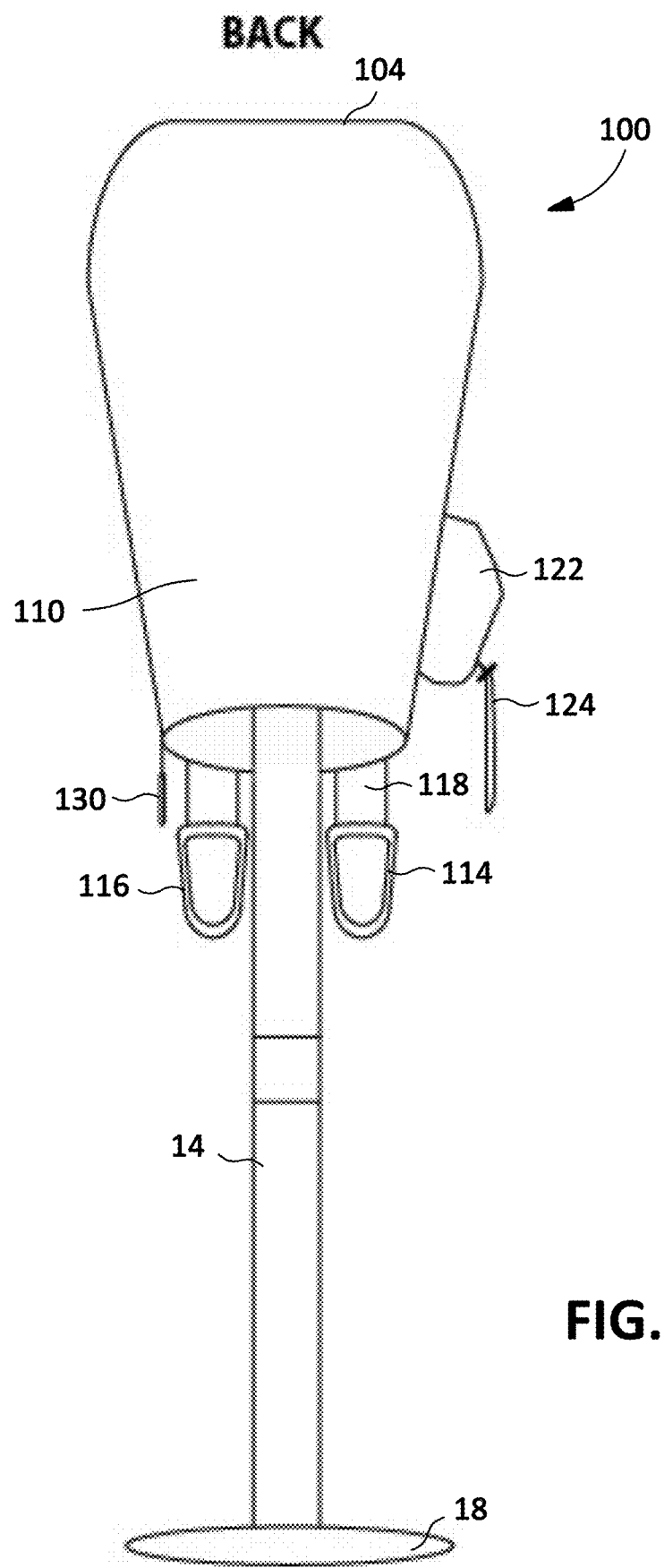
FIG. 7 is a back view of the embodiment of the protective cover of FIG. 5 according to the inventive principles of this patent disclosure.

FIG. 7 is a back view of the embodiment of the protective cover 100 according to the inventive principles of this patent disclosure. In this view it can be seen that the back panel 110 and the top panel 104 are actually formed from a single piece of material. The pocket 122 and drawstring closure 124 are also visible in this view.

Figure 8:
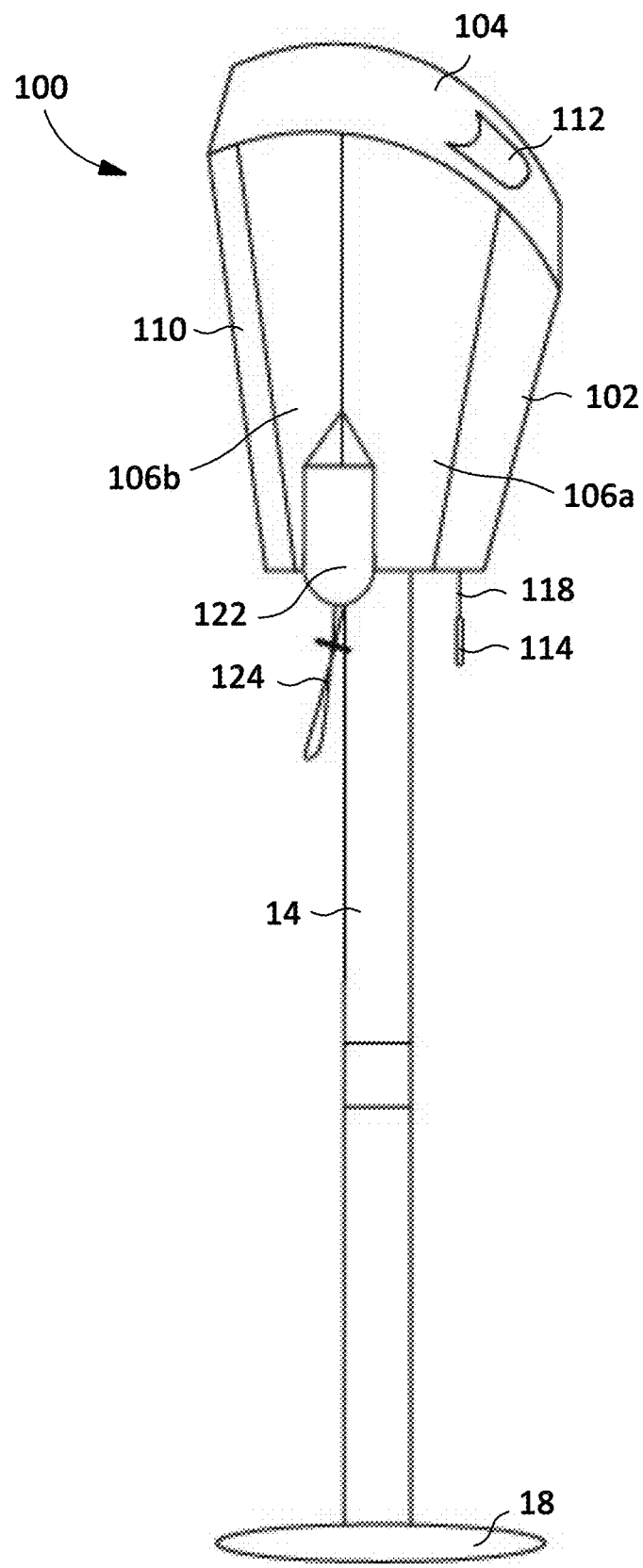
FIG. 8 is a right side view of the embodiment of the protective cover of FIG. 5 according to the inventive principles of this patent disclosure.

FIG. 8 is a right side view of the embodiment of the protective cover 100 according to the inventive principles of this patent disclosure. In this view it can be seen that the right side panel 106 is fabricated with front and back subpanels 106a and 106b, respectively.

Figure 9:
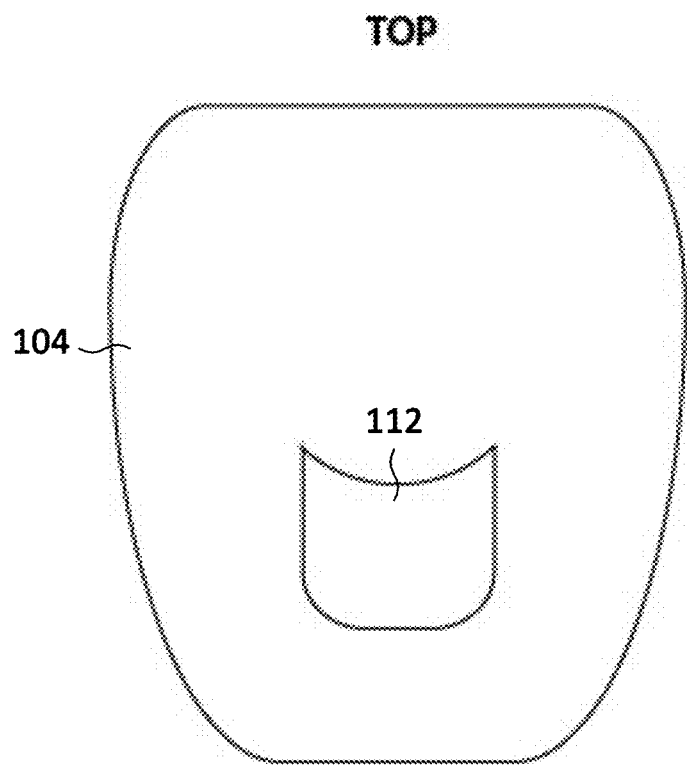
FIG. 9 is a top view of the embodiment of the protective cover of FIG. 5 according to the inventive principles of this patent disclosure.

FIG. 9 is a top view of the embodiment of the protective cover 100 according to the inventive principles of this patent disclosure. In this view the window 112 made from a transparent material can be seen in the top panel 104.

The embodiment of FIGS. 5-9 is generally intended for use with the tongue jack shown in FIG. 1, but the inventive principles are not limited to that specific model.

Figure 10:
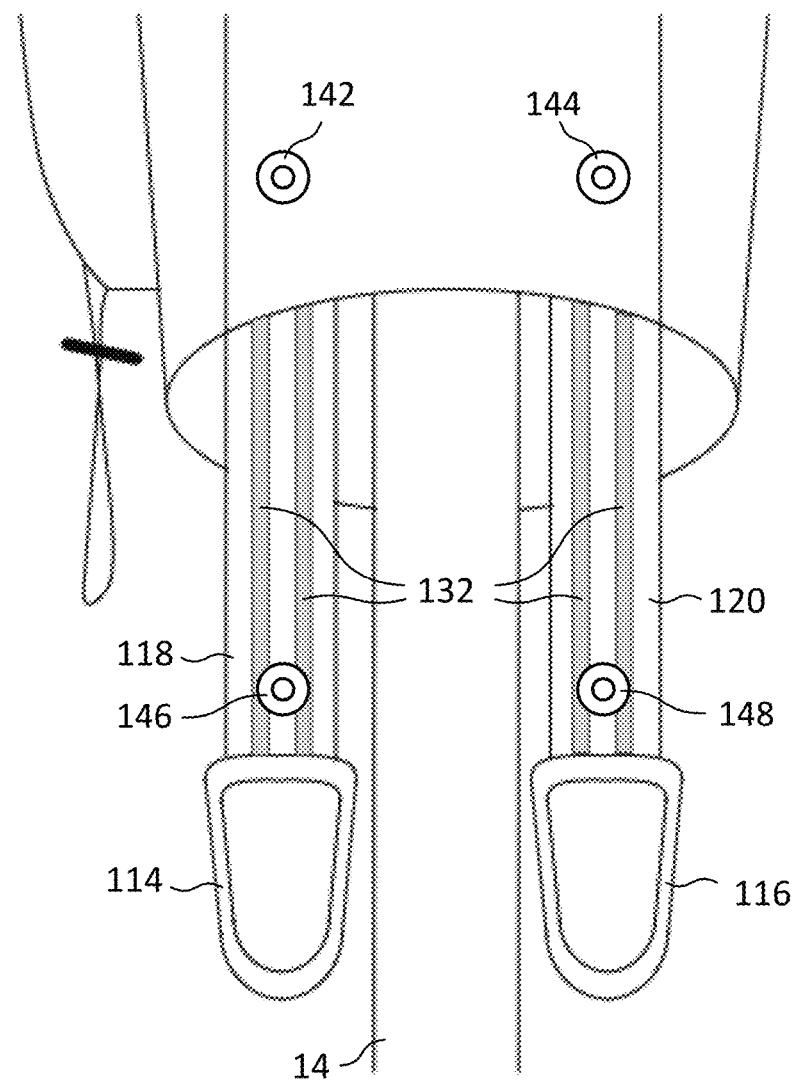
FIG. 10 illustrates other features that may be included on a protective cover according to the inventive principles of this patent disclosure.

FIG. 10 illustrates other features that may be included on a protective cover according to the inventive principles of this patent disclosure. In the embodiment of FIG. 10, one or more reflective or glow-in-the-dark strips 132 are added to the straps 118 and 120. These allow the trailer tongue jack to be located in the dark which is a frequent need for RVs and other trailers. For example, it may become apparent to an occupant of an RV that the trailer needs leveling. If this occurs at night, the occupant often ends up fumbling in the dark to find the jack to adjust the tongue height. Placing the luminous strips 132 on the straps 118 and 120 has been found to be a beneficial location, but one or more luminous devices may alternatively be placed elsewhere on the cover 100 or in addition to the straps 118 and 120.

Some trailer operators may decide to leave the protective cover on the tongue jack even when the trailer is being towed. In such a situation, the safety chains will be attached to the trailer hitch, so the straps 118 and 120 and D-rings 114 and 116 may dangle from the cover, possibly scratching the column 14 and/or causing unpleasant noise. Therefore, a snap or other attachment device may be included for each of the straps 118 and 120 to enable the strap to be folded up and attached along the side of the cover, thereby holding the D-ring away from the column 14. In the embodiment of FIG. 10, an attachment device for strap 118 is shown as a snap having a stud/ring side 142 attached to the cover and a socket/cap side 146 attached to the strap 118. Another stud/ring 144 is attached to the cove to connect with a socket/cap 148 on the other strap 120.

Figure 11:
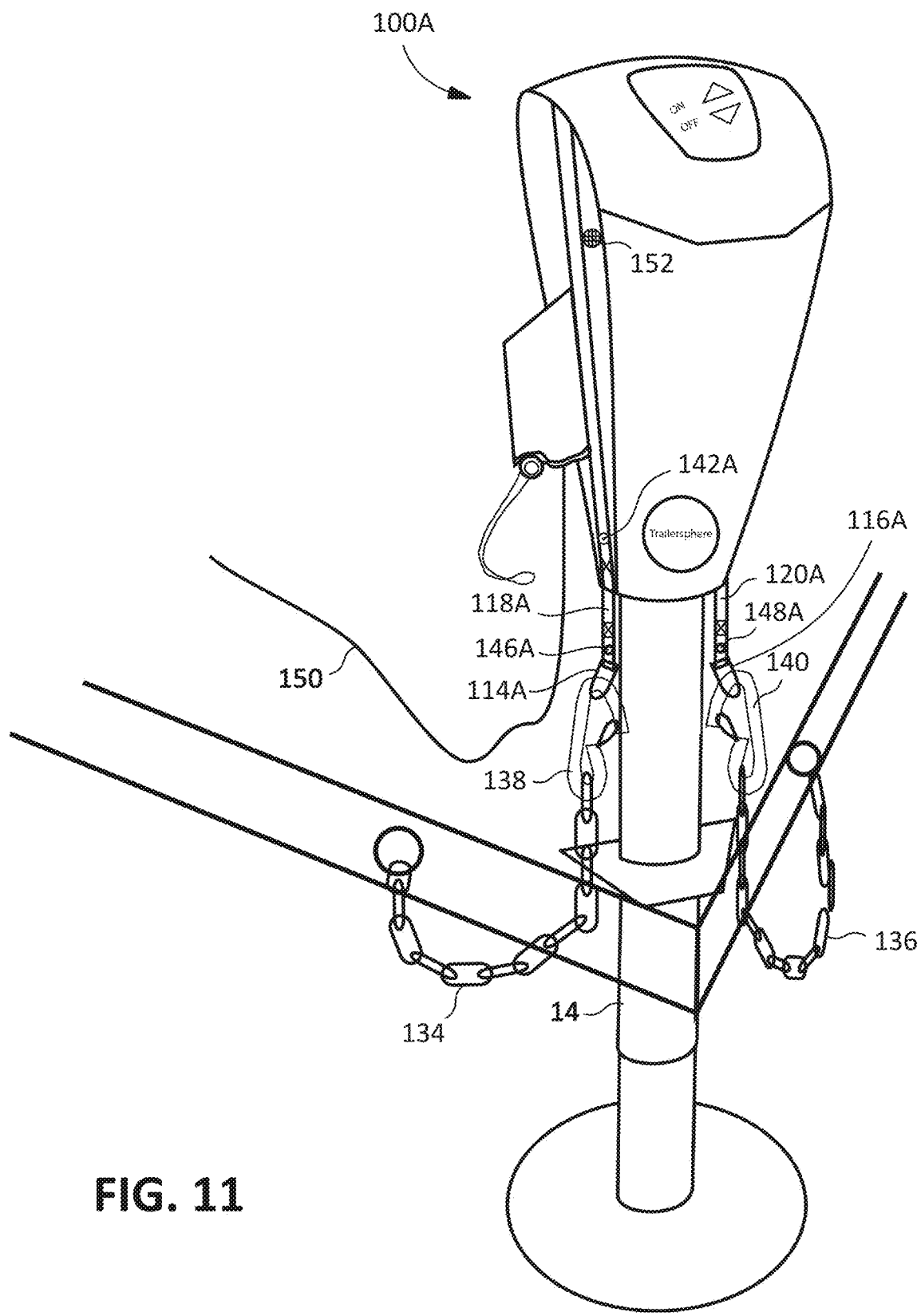
FIGS. 11 and 12 illustrate another embodiment of a protective cover and organizer for a trailer tongue jack according to the inventive principles of this patent disclosure.
Figure 12:
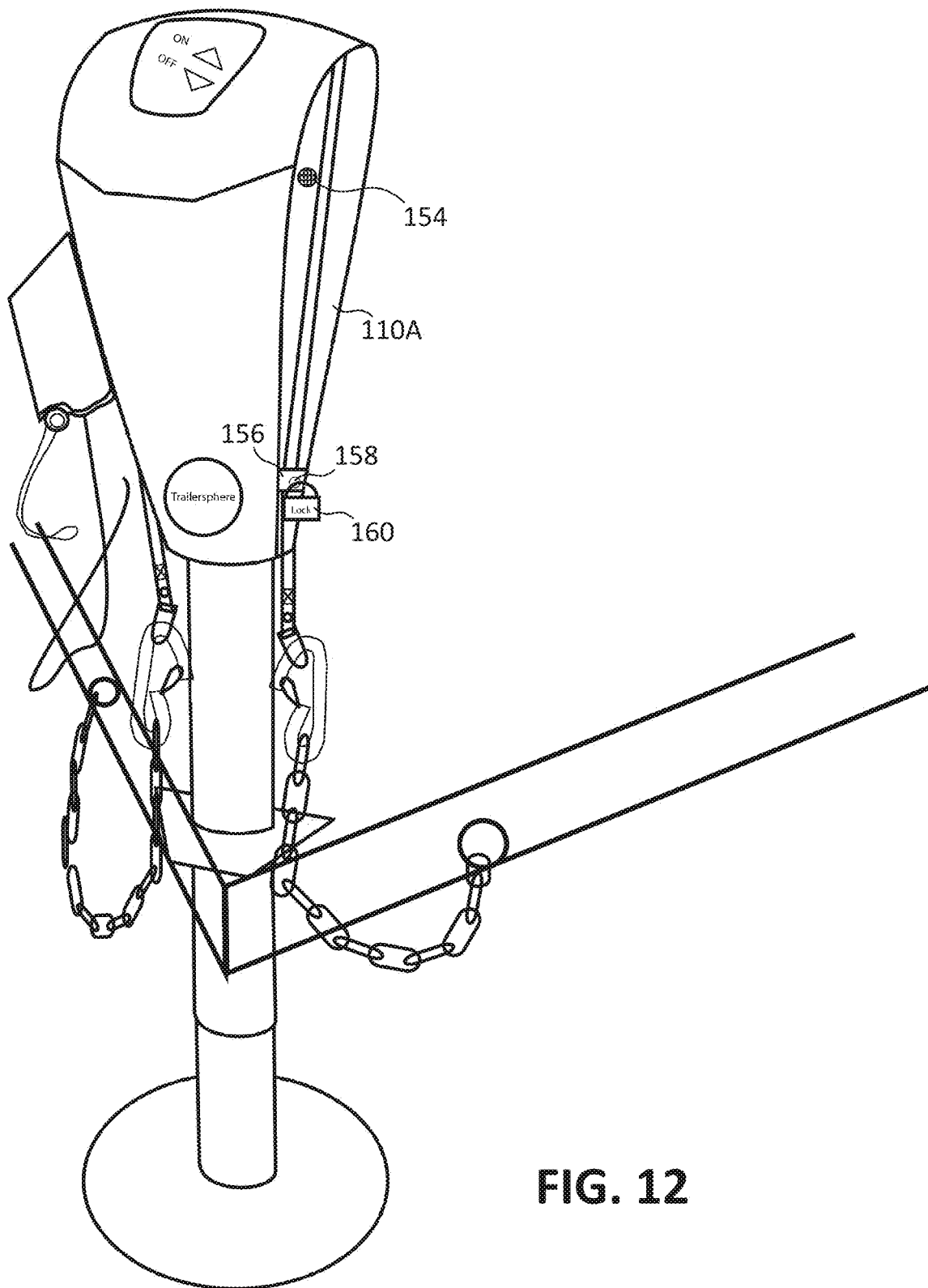

FIGS. 11 and 12 illustrate another embodiment of a protective cover and organizer for a trailer tongue jack according to the inventive principles of this patent disclosure. The embodiment of FIGS. 11 and 12 is similar to the embodiment of FIGS. 5-9 but with the following differences. The straps 118A and 120A are attached along the sides of the cover 100A and run the entire height of the cover. This distributes the weight of the safety chains 134 and 136 and hooks 138 and 140 over more of the cover, thereby providing a more durable attachment point for the D-rings 114A and 116A. It also provides a convenient base for applying longer reflective or glow-in-the-dark strips to the cover, thereby improving visibility and providing an enhanced appearance.

Some other salient features visible in FIGS. 11 and 12 include the wiring harness 150, snap parts 142A, 146A and 148A, and vents 152 and 154 which allow the cover 100A to breathe.

Referring to FIG. 12, a strap 156 includes a gromet 158 which aligns with another gromet on the cover 100A, thereby allowing the hasp of a padlock 160 to be fed through the gromets and secure the cover 110A to the head of the tongue jack.

Figure 13:
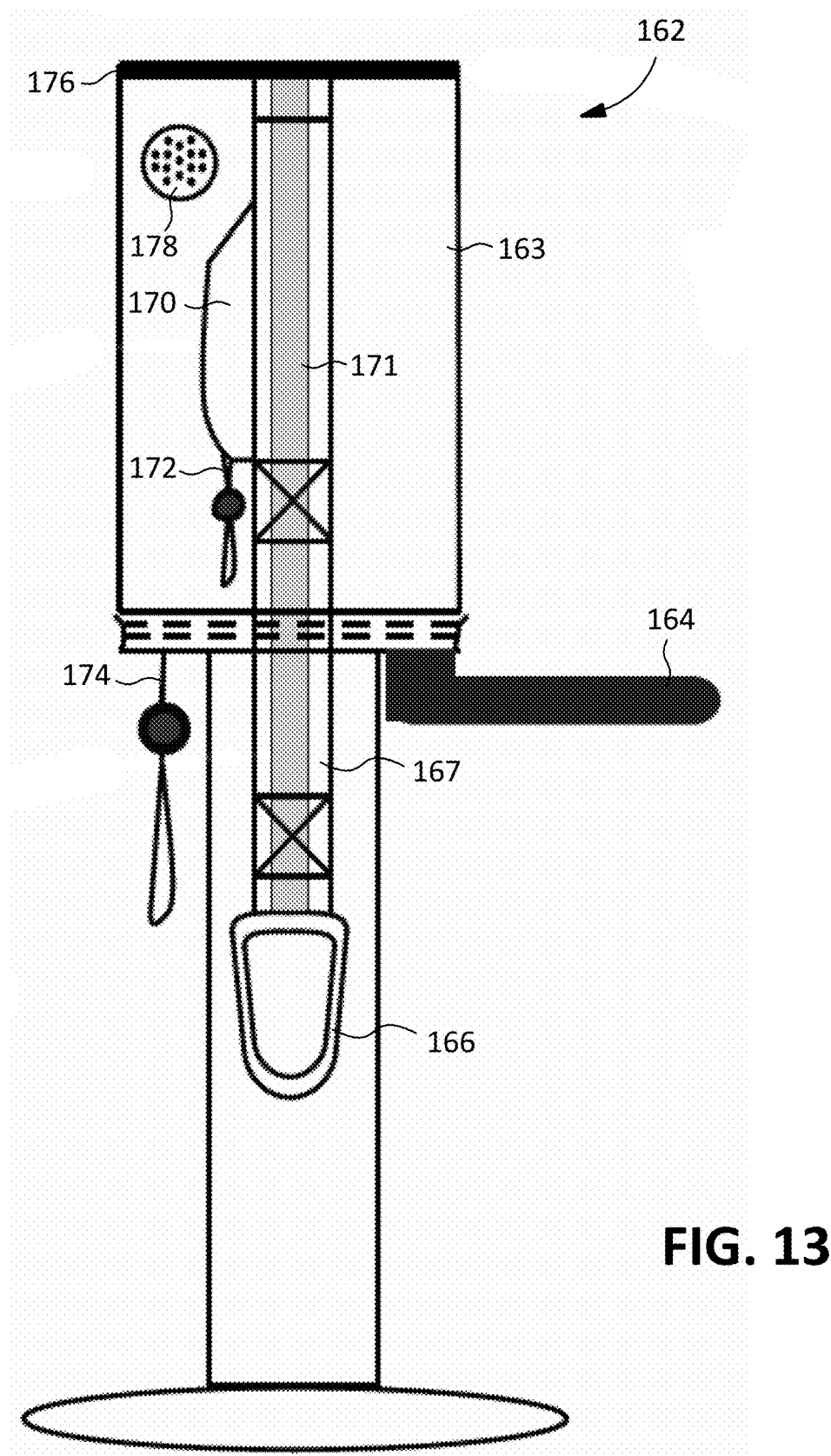
FIGS. 13, 14 and 15 are right side, front, and left side views, respectively, of another embodiment of a protective cover/organizer for a manually operated trailer tongue jack according to some inventive principles of this patent disclosure.
Figure 14:
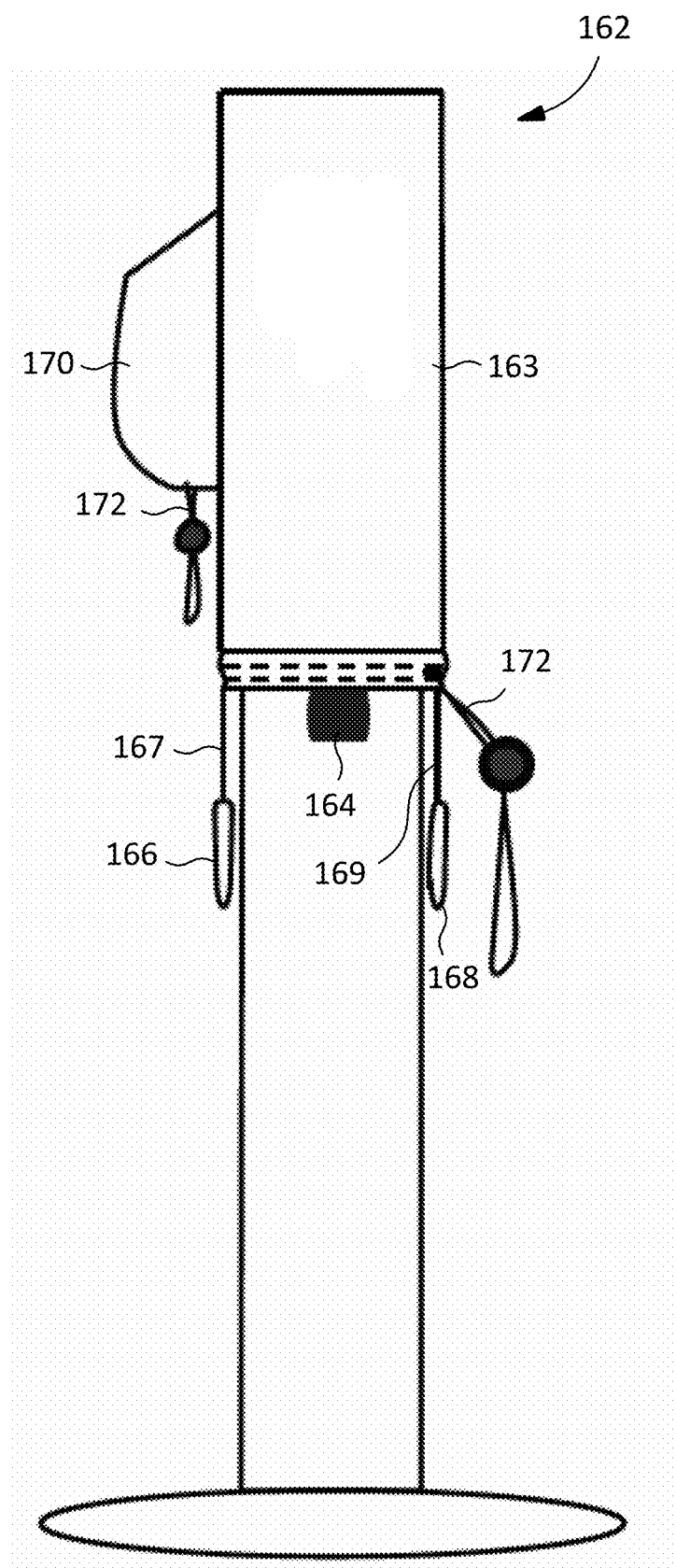
Figure 15:
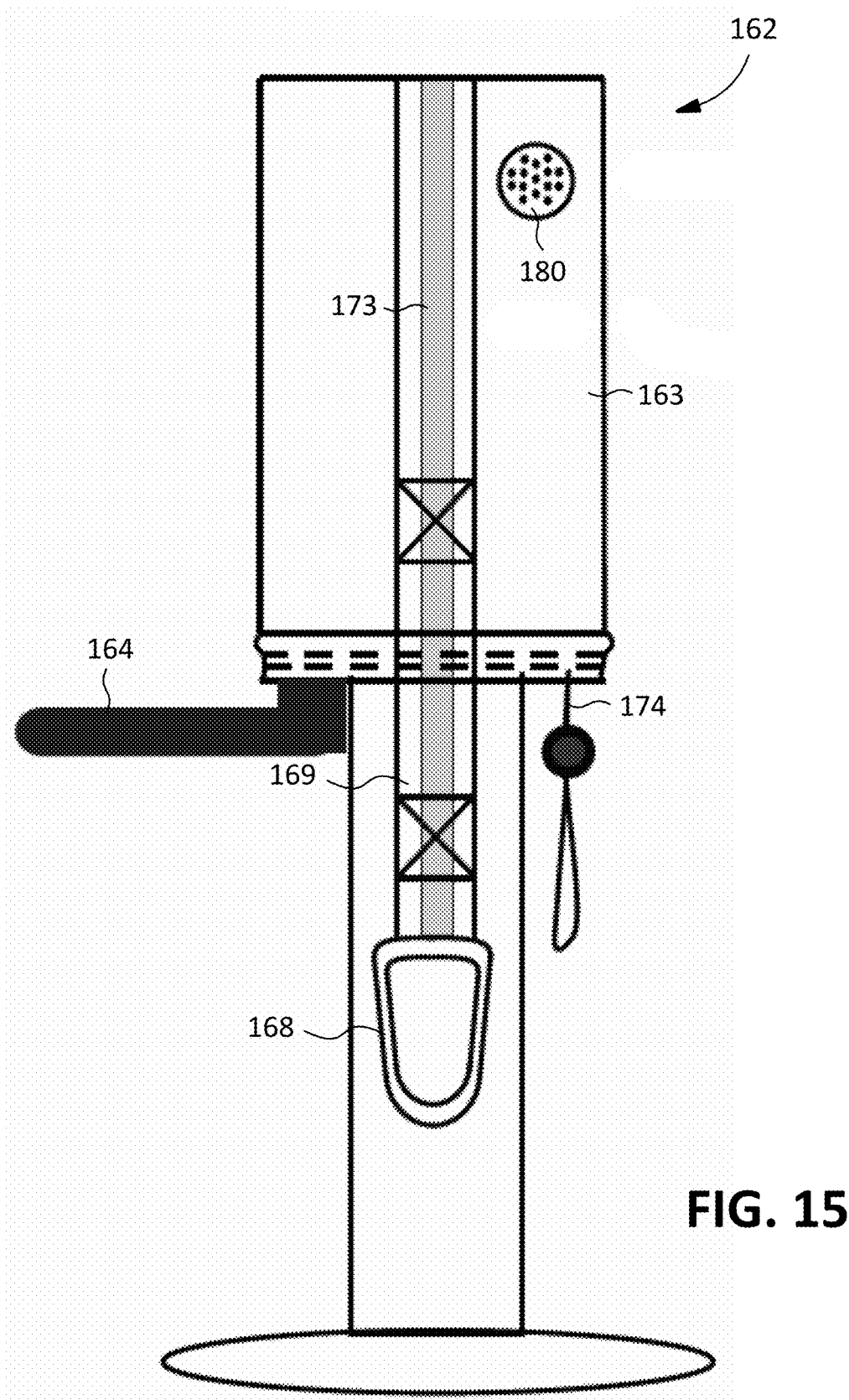

FIGS. 13, 14 and 15 are right side, front, and left side views, respectively, of another embodiment of a protective cover/organizer 162 for a trailer tongue jack according to some inventive principles of this patent disclosure. The embodiment of FIGS. 13-15 is intended for use with, and shown installed on, a manual trailer tongue jack which has a crank handle 164 to manually raise and lower the trailer tongue. The embodiment of FIGS. 13-15 includes chain hook loops 166 and 168 for hanging safety chains and a pouch 170 for holding an electric plug for a wiring harness. The loops 166 and 168 are attached to the cover 163 by straps 167 and 169, respectively, which hang down from the cover and also run the entire height of the cover and may include reflective strips 171 and 173. The pouch 170 and/or cover body may include drawstrings 172 and 174, respectively, or other type of closure to secure the plug to the cover and/or the cover to the jack by cinching the drawstrings down. The embodiment of FIGS. 13-15 may also include a rigid component 176 to support the cover/organizer on top of the jack as shown in FIG. 13. The embodiment of FIGS. 13-15 also includes air vents 178 and 180 which may optionally be included on any embodiment according to the inventive principles of this patent disclosure.

Figure 16:
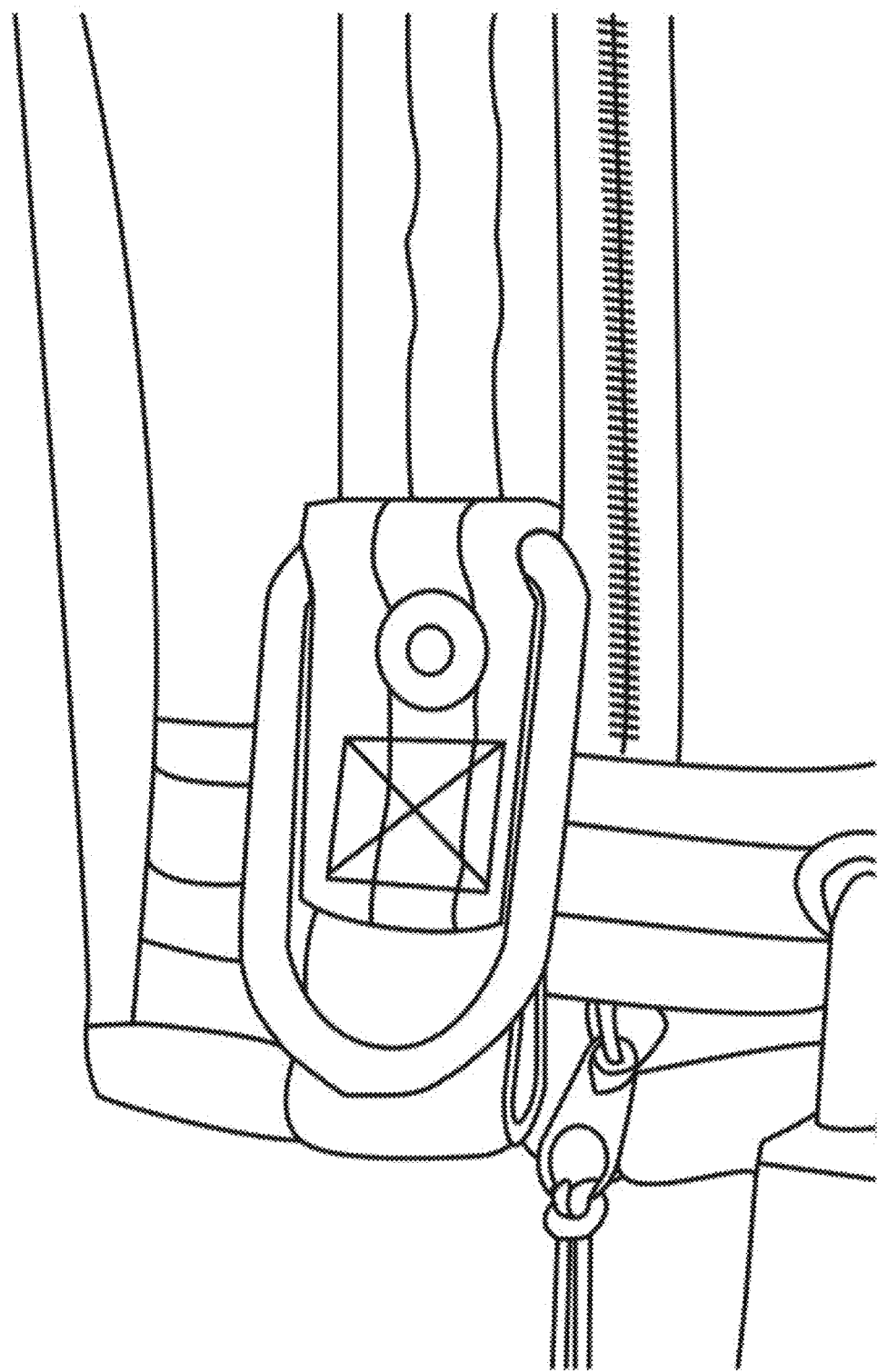
FIG. 16 illustrates how a strap for a D-ring may be snapped to a protective cover to store the D-ring while it is not in use according to the inventive principles of this patent disclosure.
Figure 17:
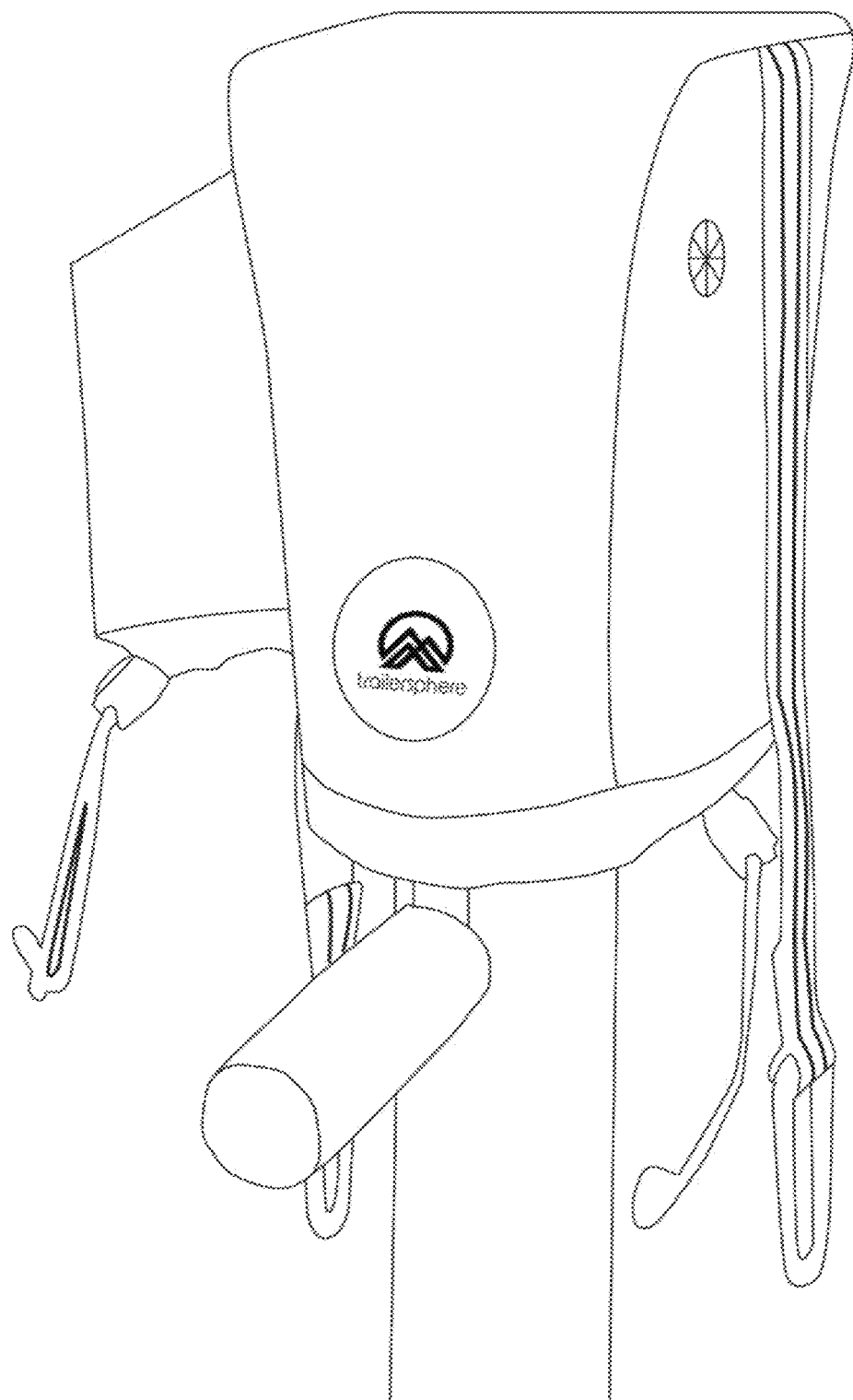
FIGS. 17-19 illustrate another embodiment of a protective cover/organizer for a manually operated trailer tongue jack according to some inventive principles of this patent disclosure.
Figure 18:
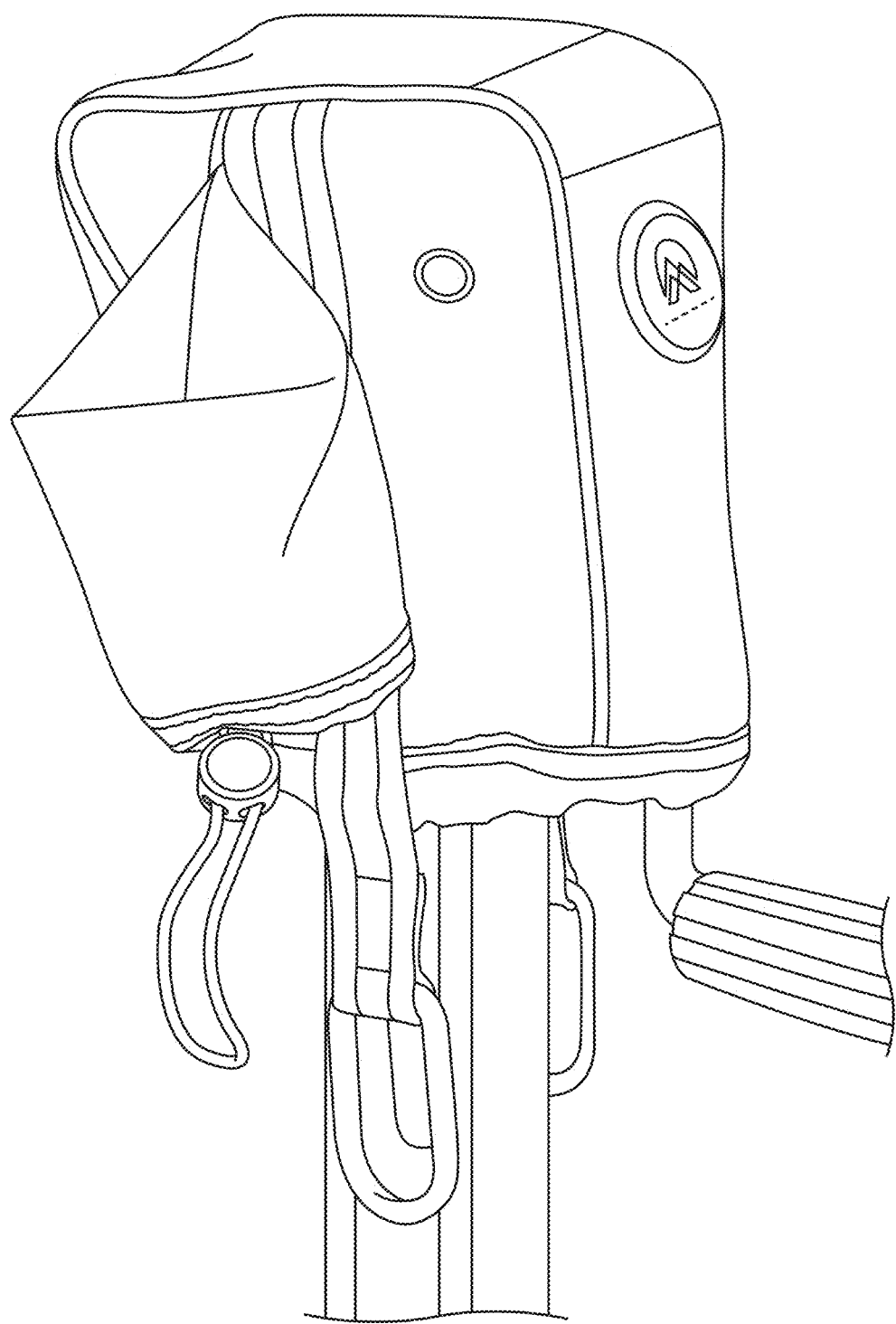
Figure 19:
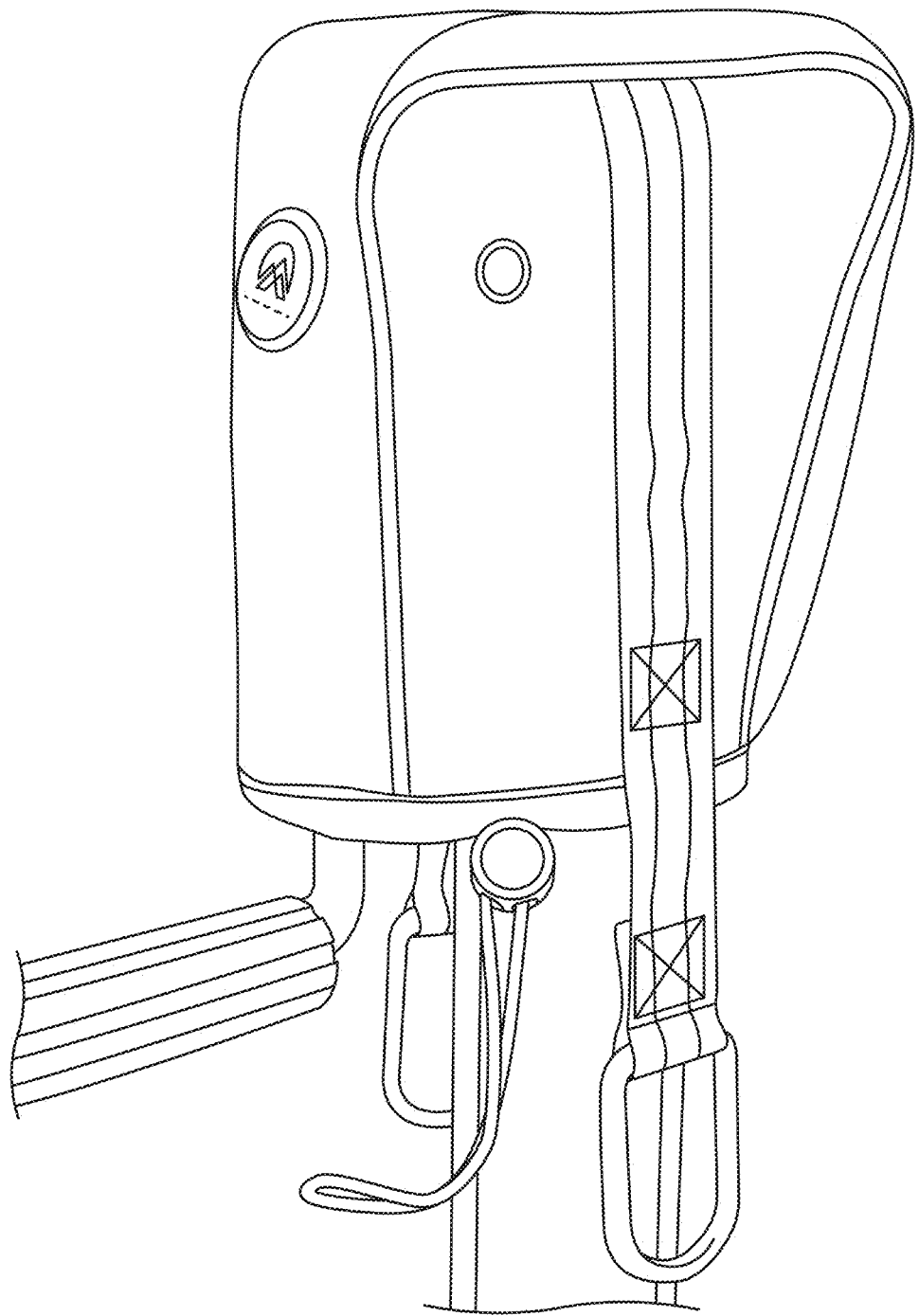
Figure 20:
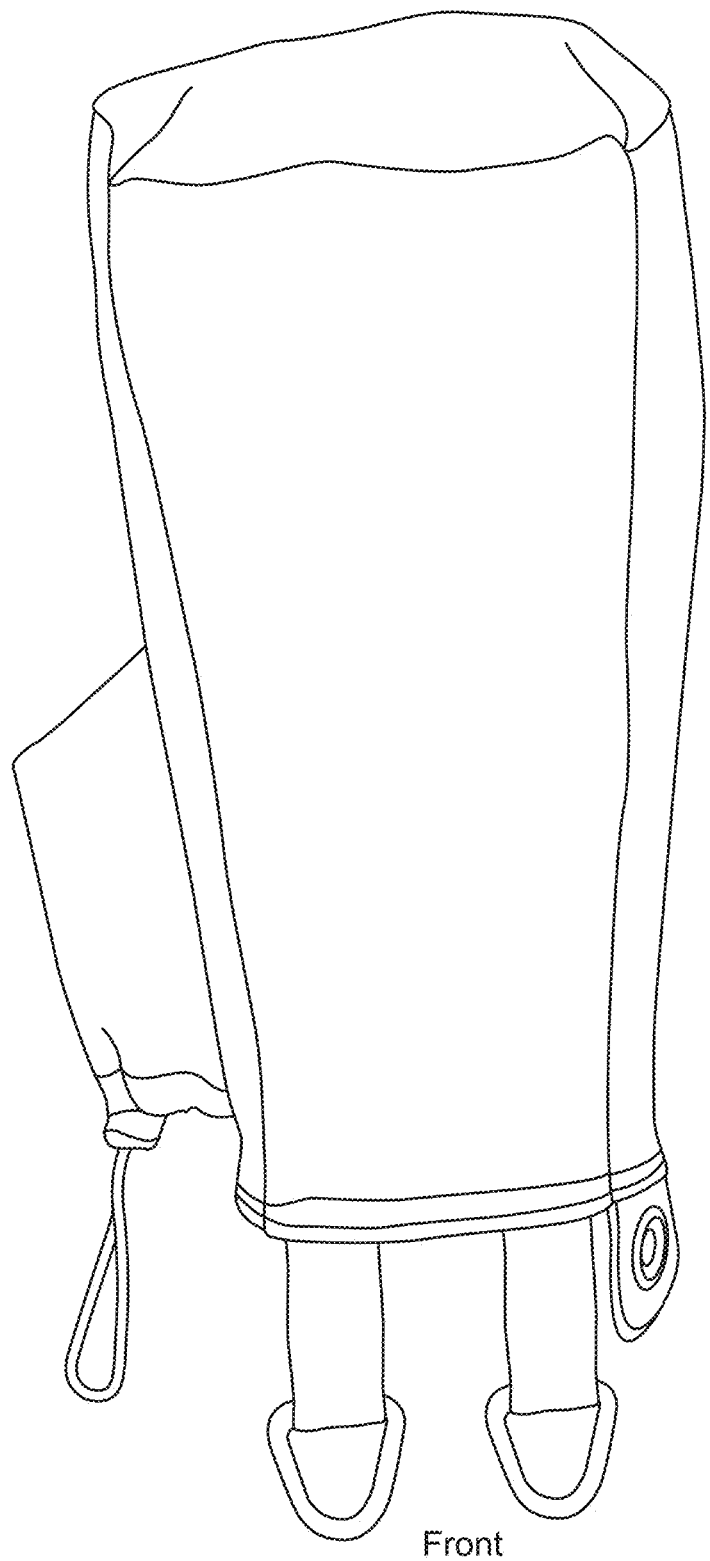
FIGS. 20-24 illustrate another embodiment of a protective cover/organizer suitable for use with a trailer tongue jack such as that shown in FIG. 1 according to some inventive principles of this patent disclosure.
Figure 21:
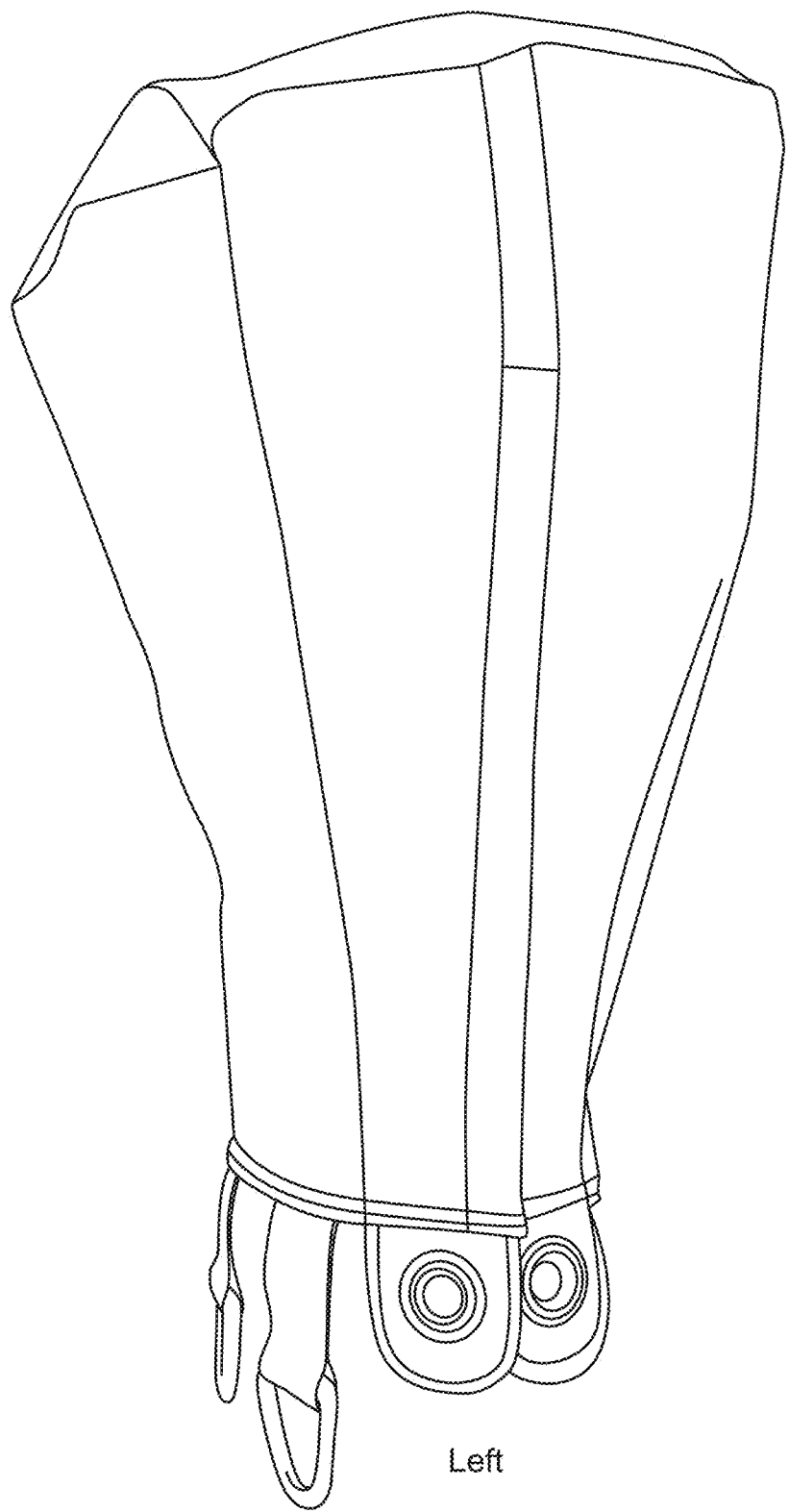
Figure 22:
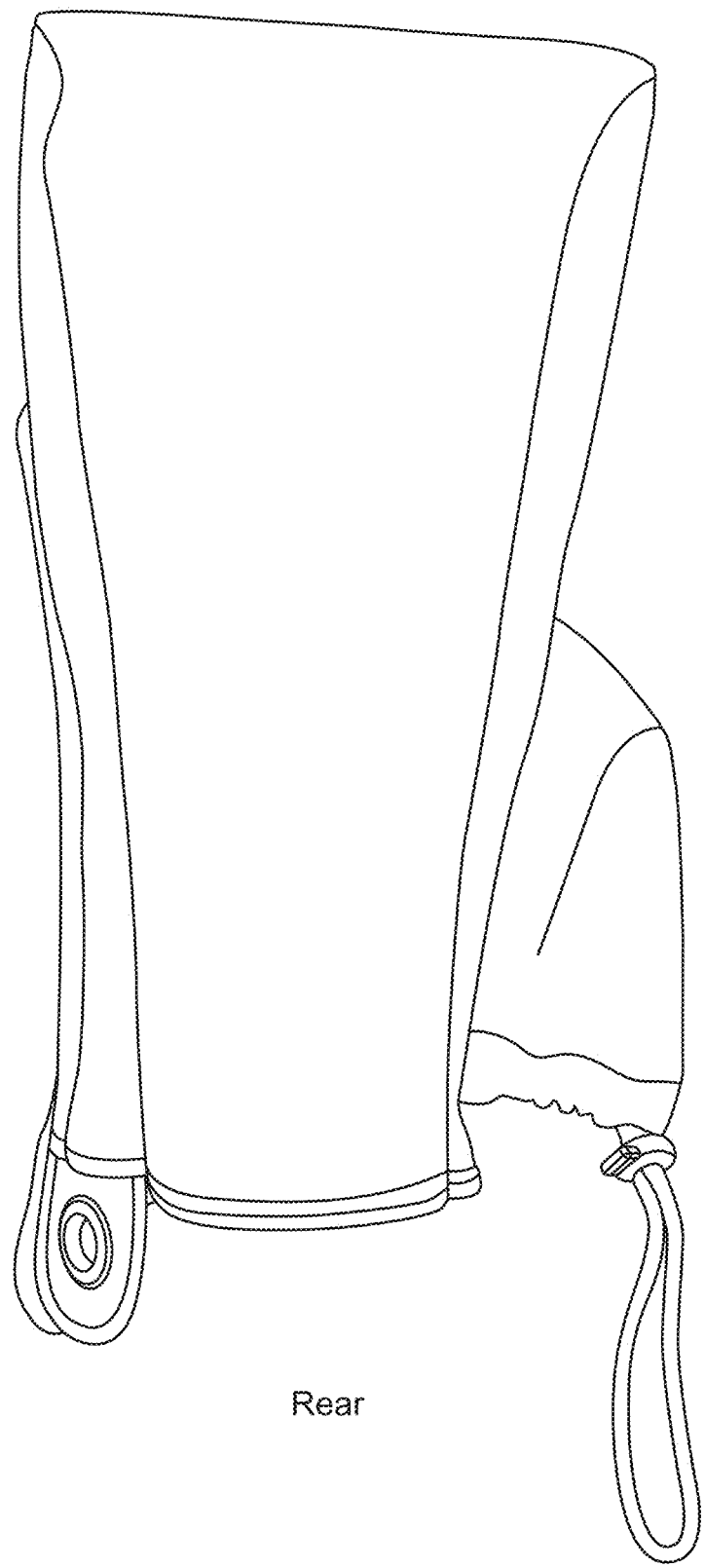
Figure 23:
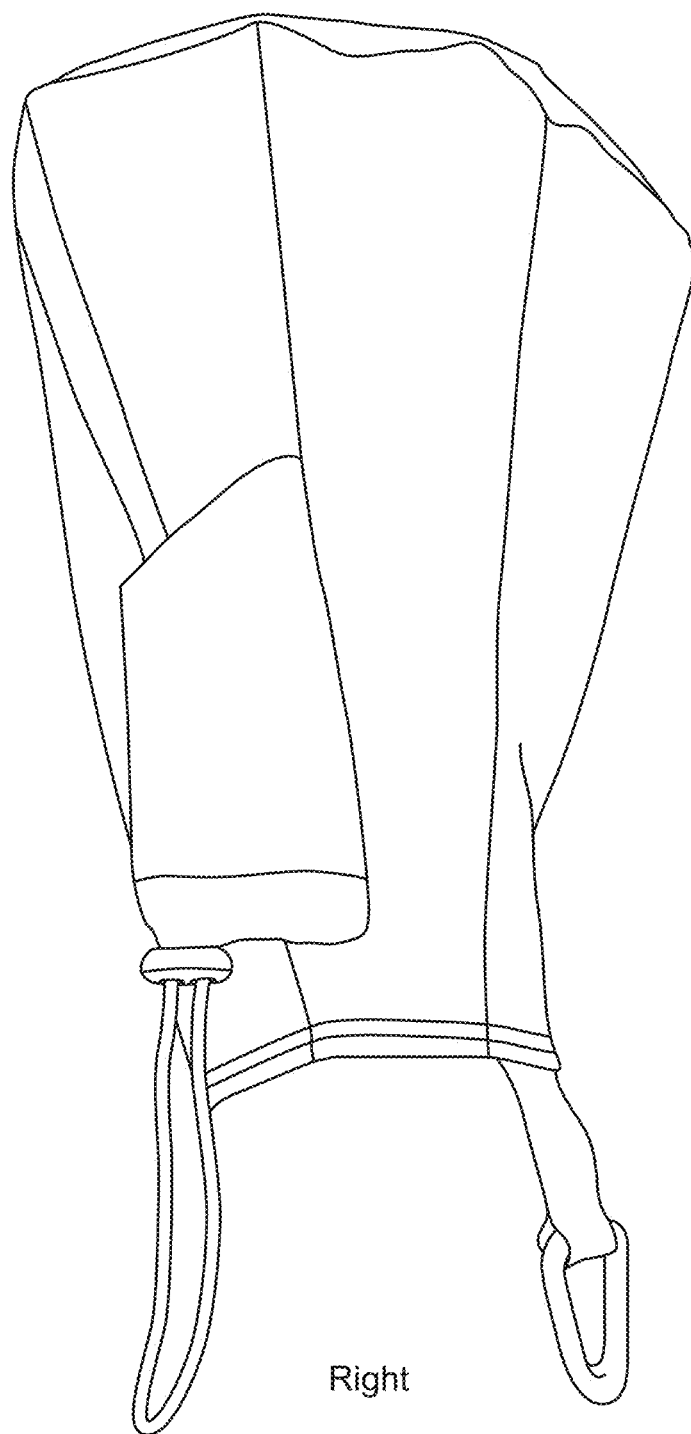
Figure 24:
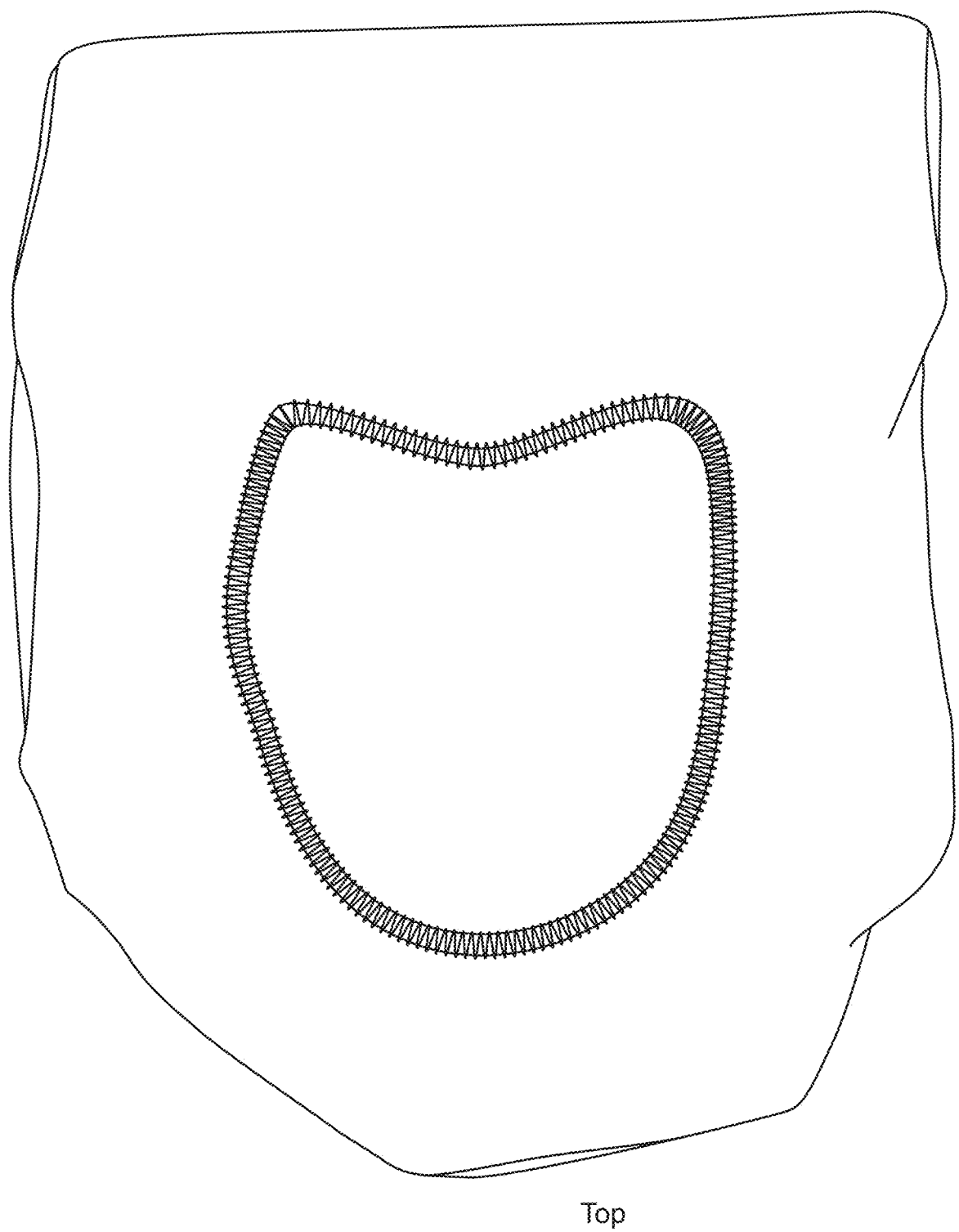
Figure 25:
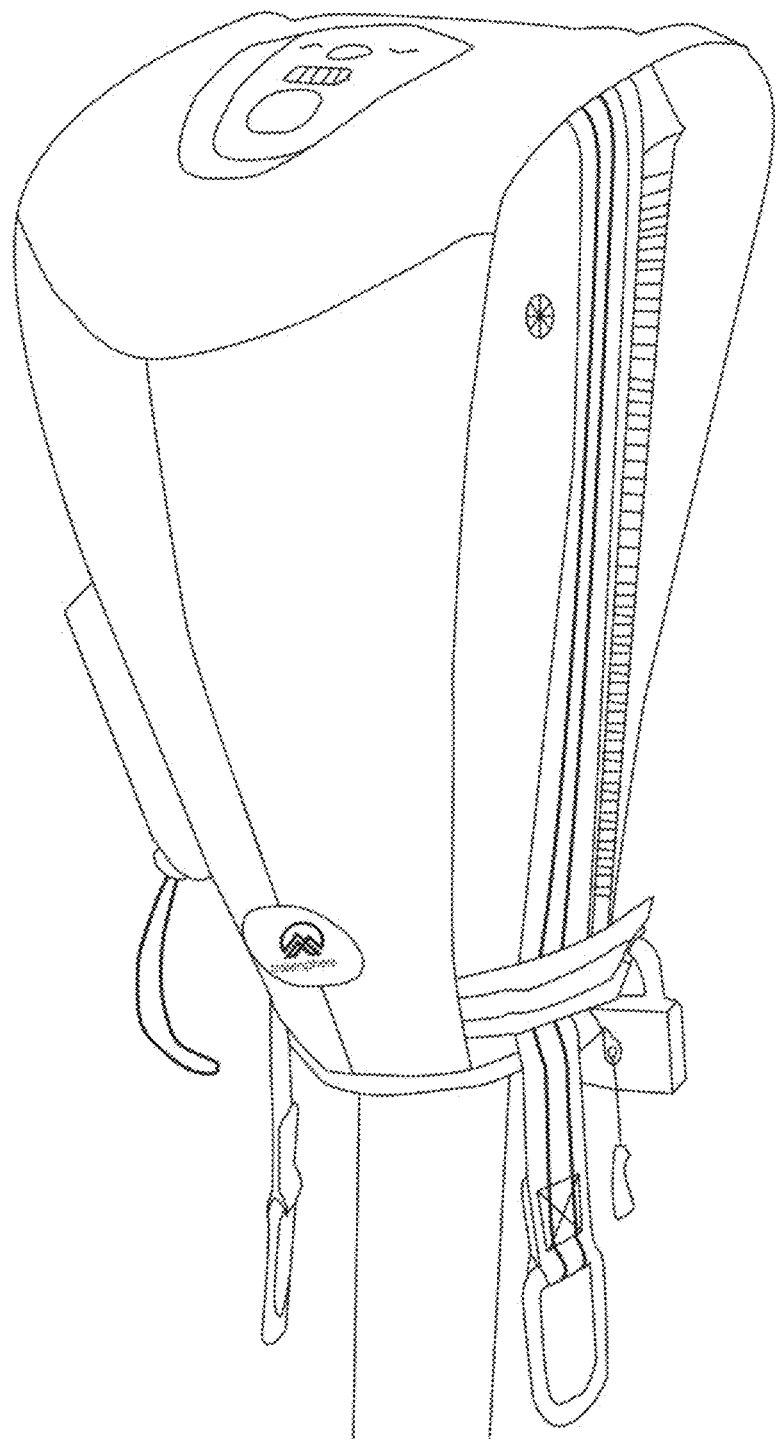
FIGS. 25-28 illustrate another embodiment of a protective cover/organizer suitable for use with a trailer tongue jack such as that shown in FIG. 1 according to some inventive principles of this patent disclosure.
Figure 26:
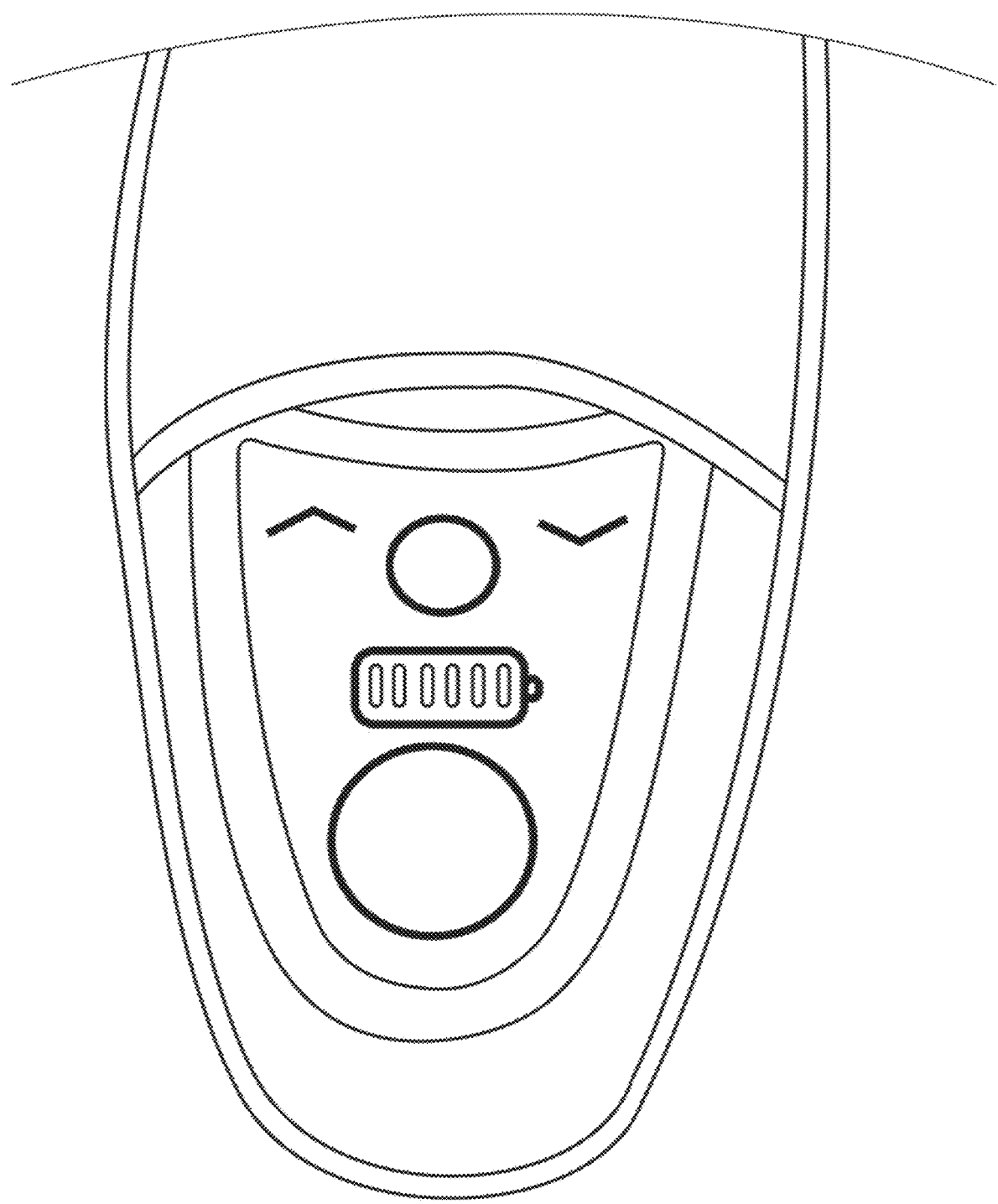
Figure 27:
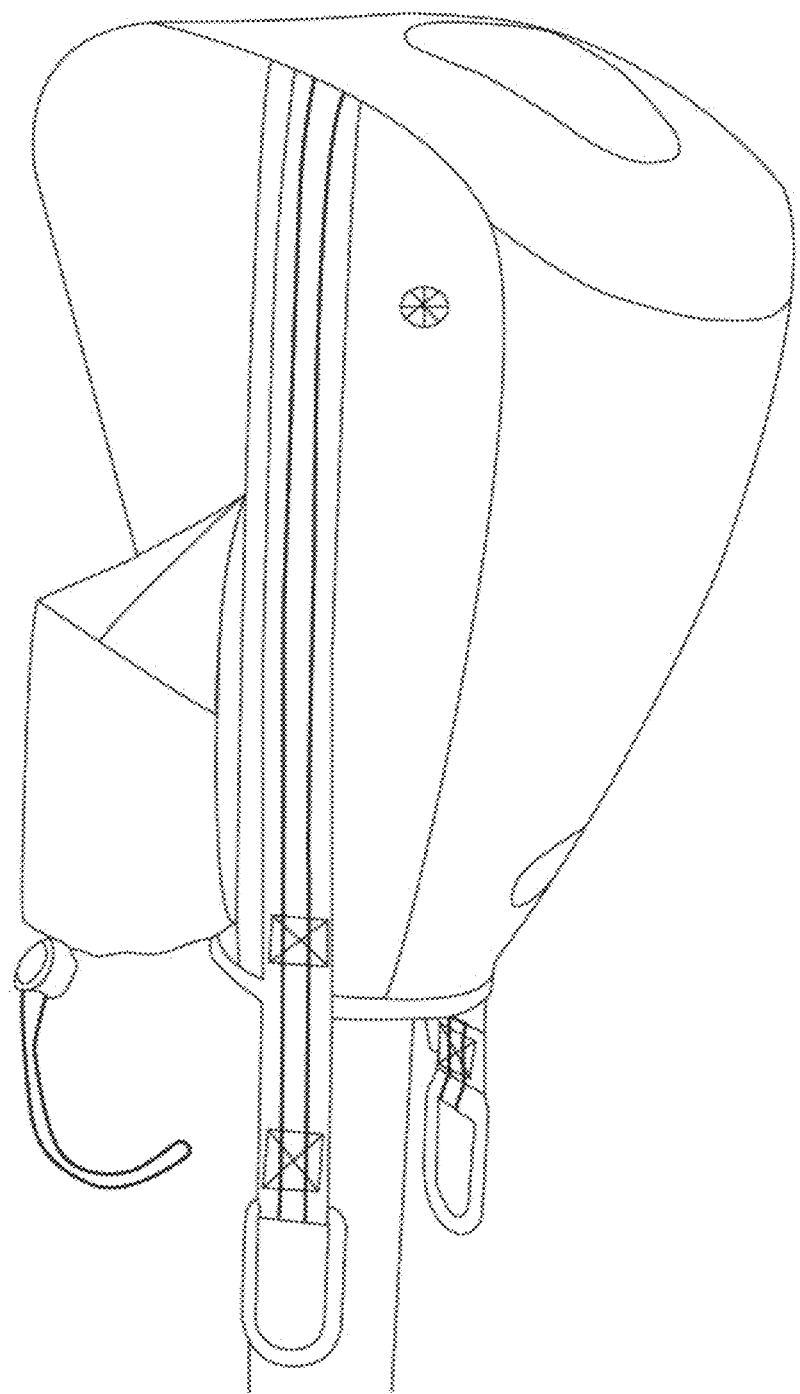
Figure 28:
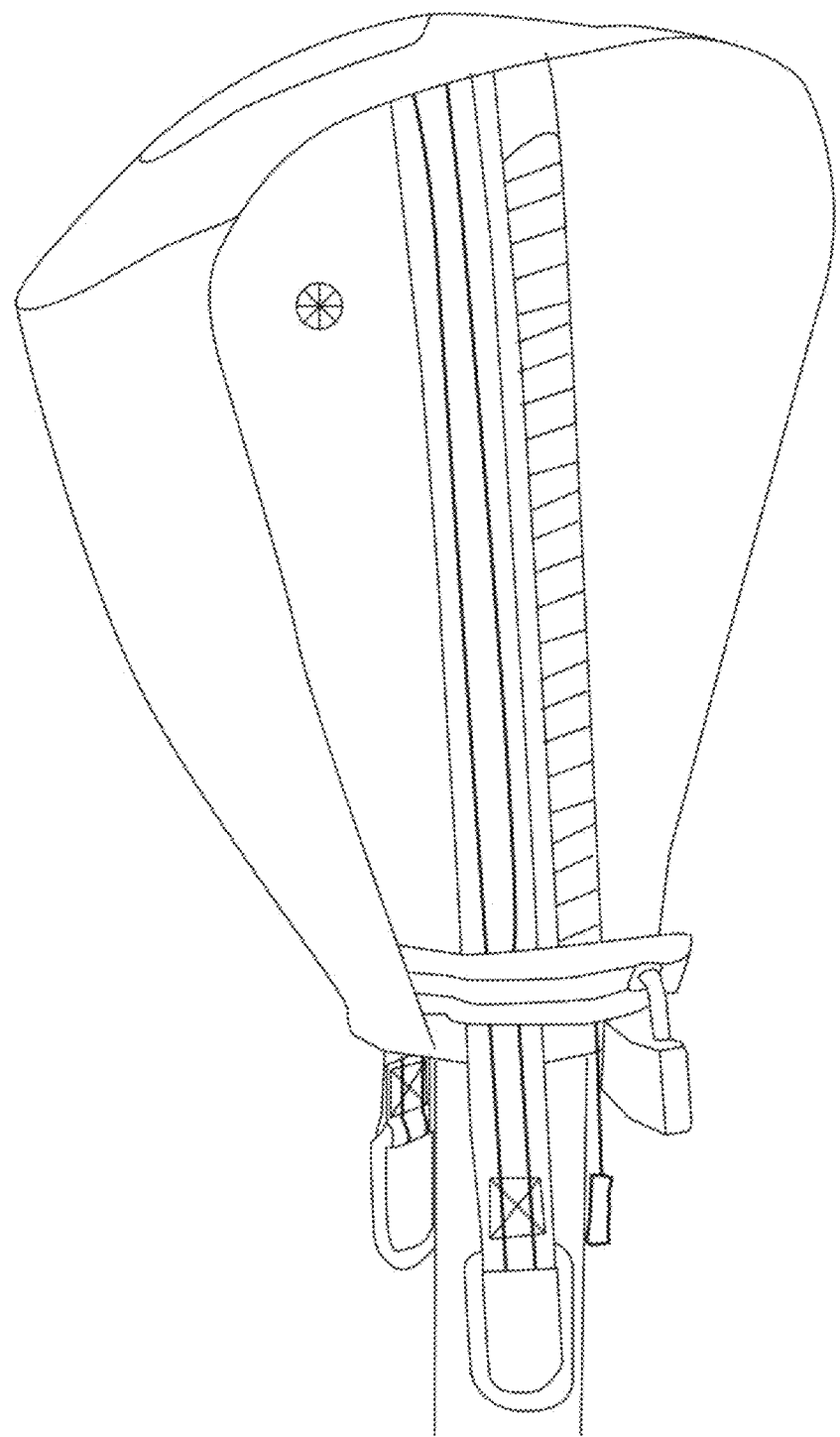
Figure 29:
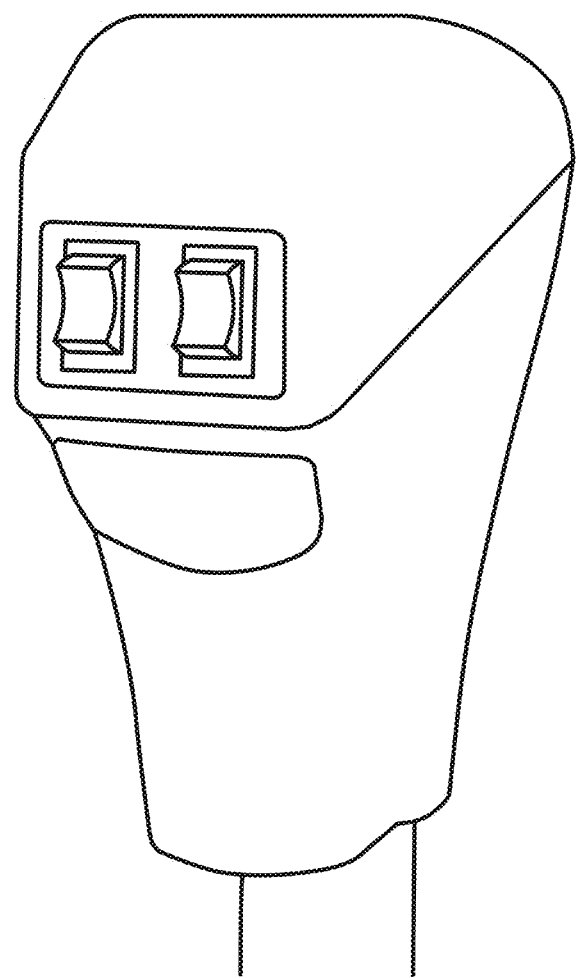
FIG. 29 illustrates an LCI trailer tongue jack.
Figure 30:
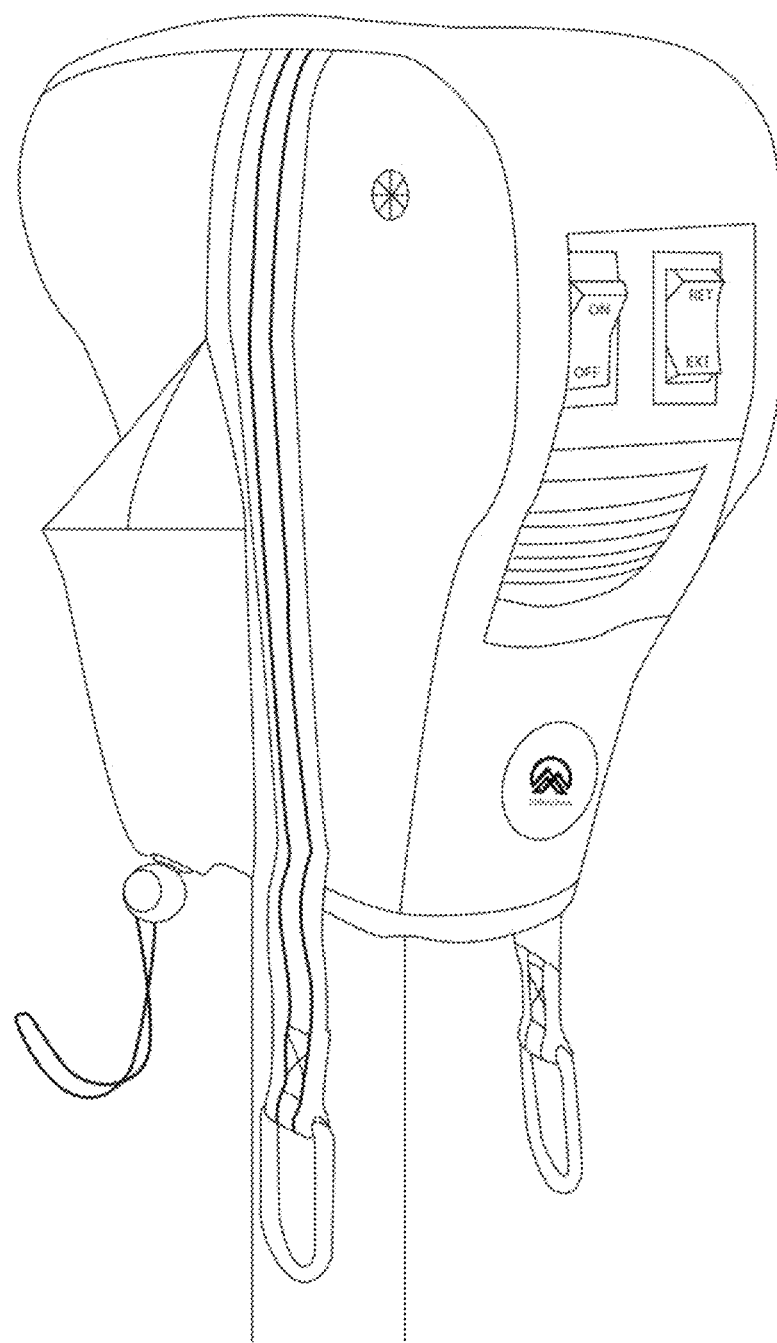
FIGS. 30-31 illustrate another embodiment of a protective cover/organizer suitable for use with the trailer tongue jack shown in FIG. 29 according to some inventive principles of this patent disclosure.
Figure 31:
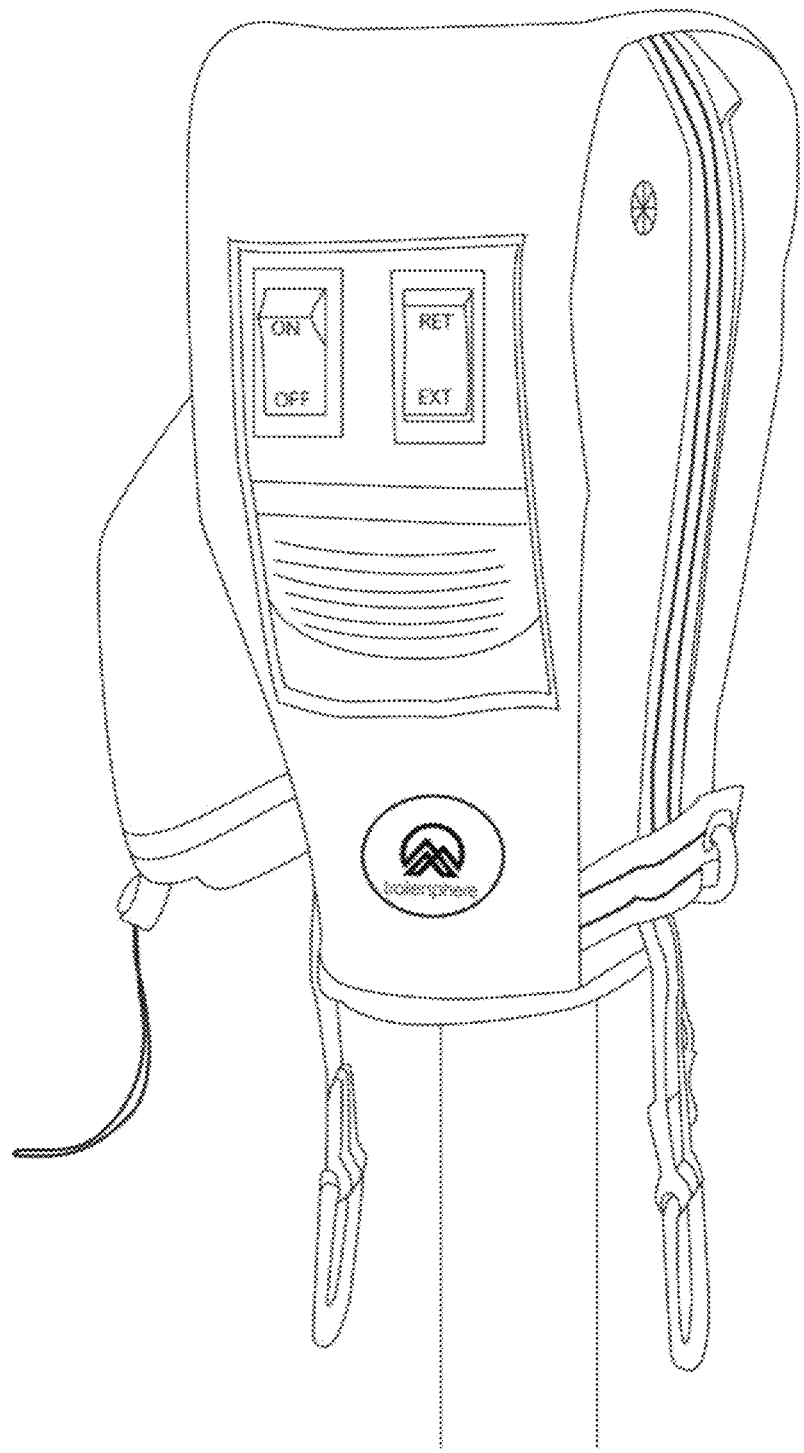
Figure 32:
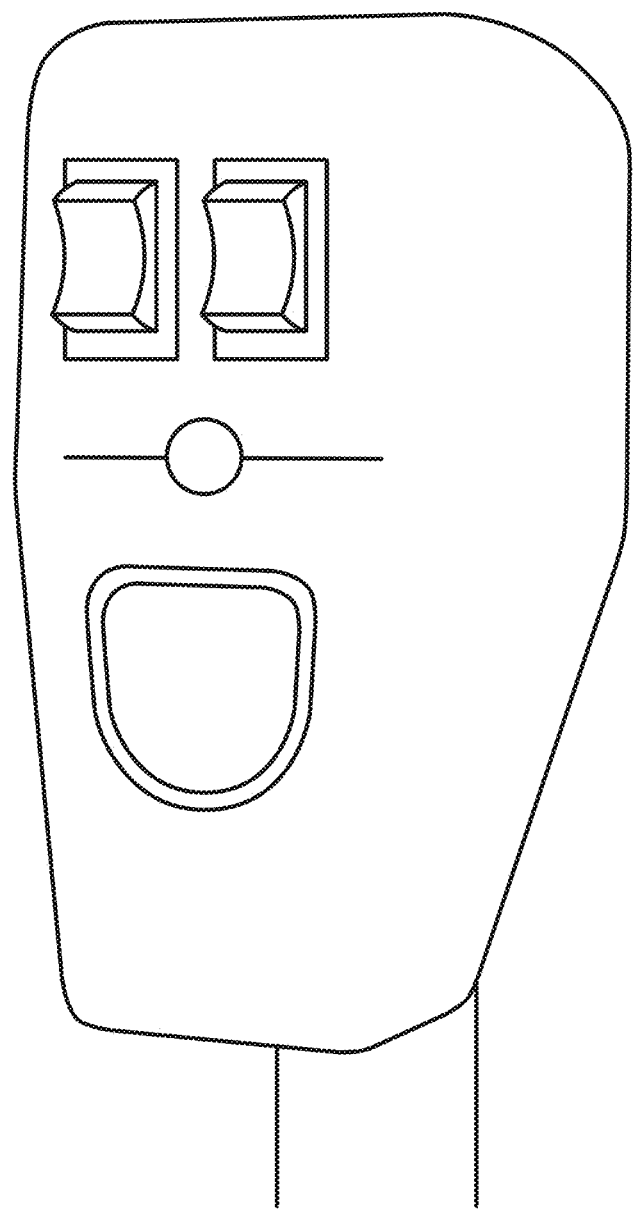
FIG. 32 illustrates an FIC trailer tongue jack.
Figure 33:
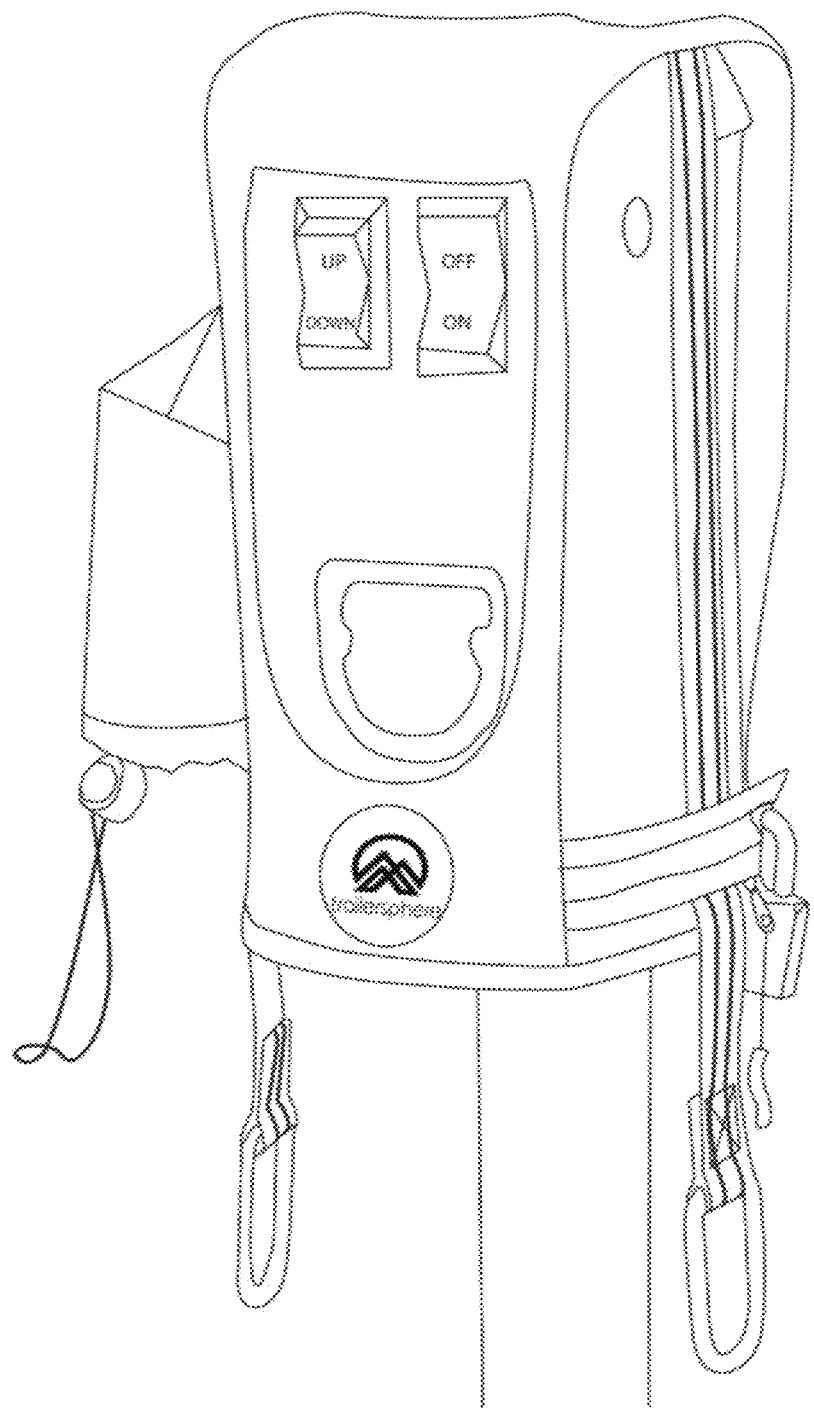
FIG. 33 illustrates another embodiment of a protective cover/organizer suitable for use with the trailer tongue jack shown in FIG. 32 according to some inventive principles of this patent disclosure.
Figure 34:
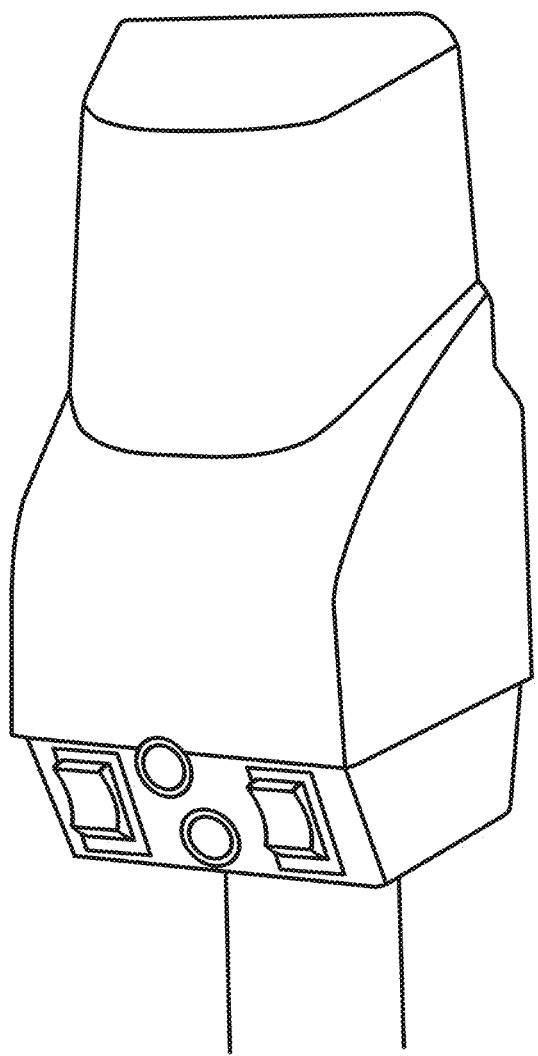
FIG. 34 illustrates an Atwood trailer tongue jack.
Figure 35:
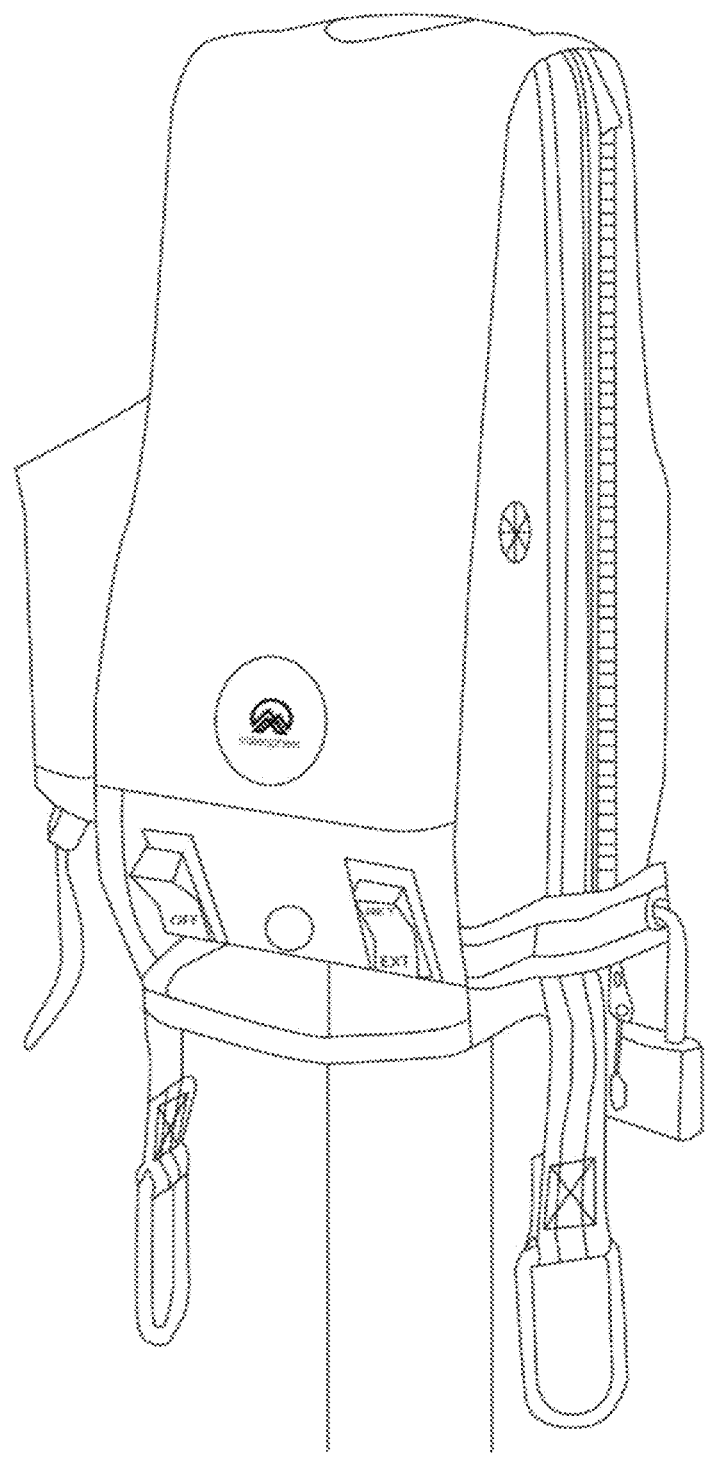
FIGS. 35-37 illustrate another embodiment of a protective cover/organizer suitable for use with the trailer tongue jack shown in FIG. 34, including access ports for a manual actuator on the front of the jack and a level on top of the jack according to some inventive principles of this patent disclosure.
Figure 36:
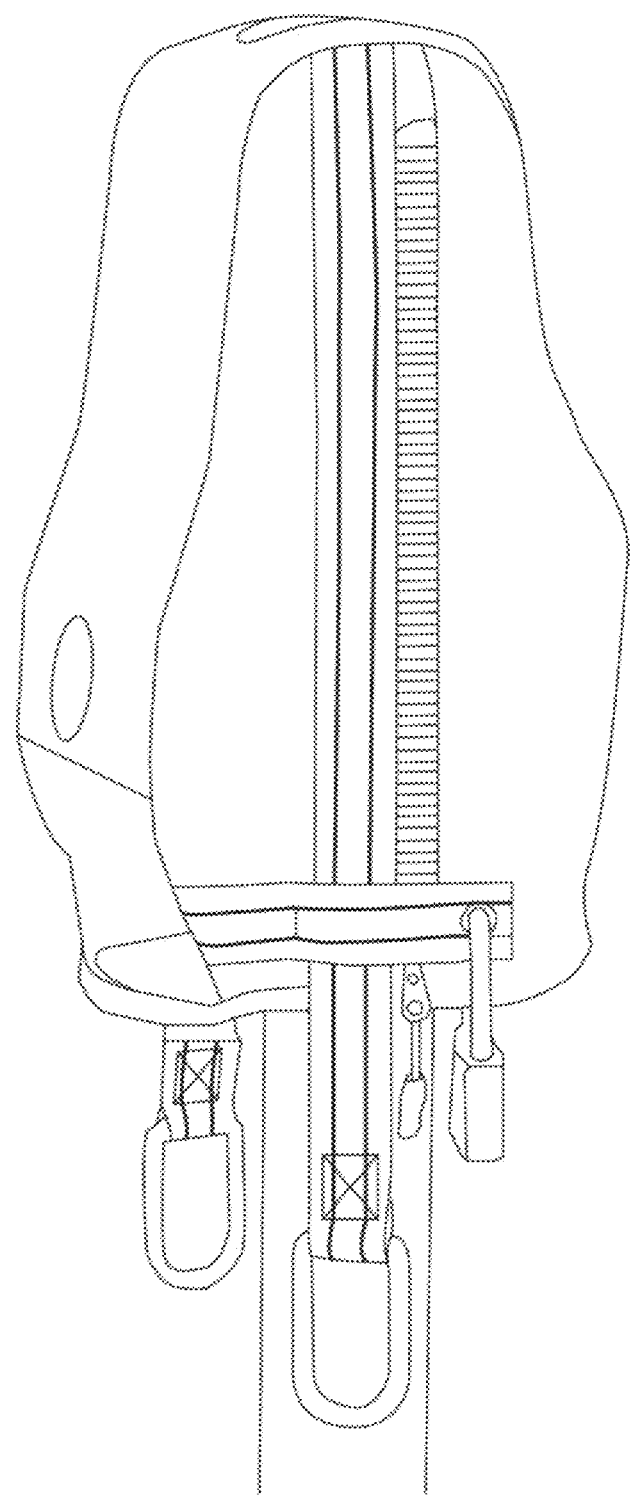
Figure 37:
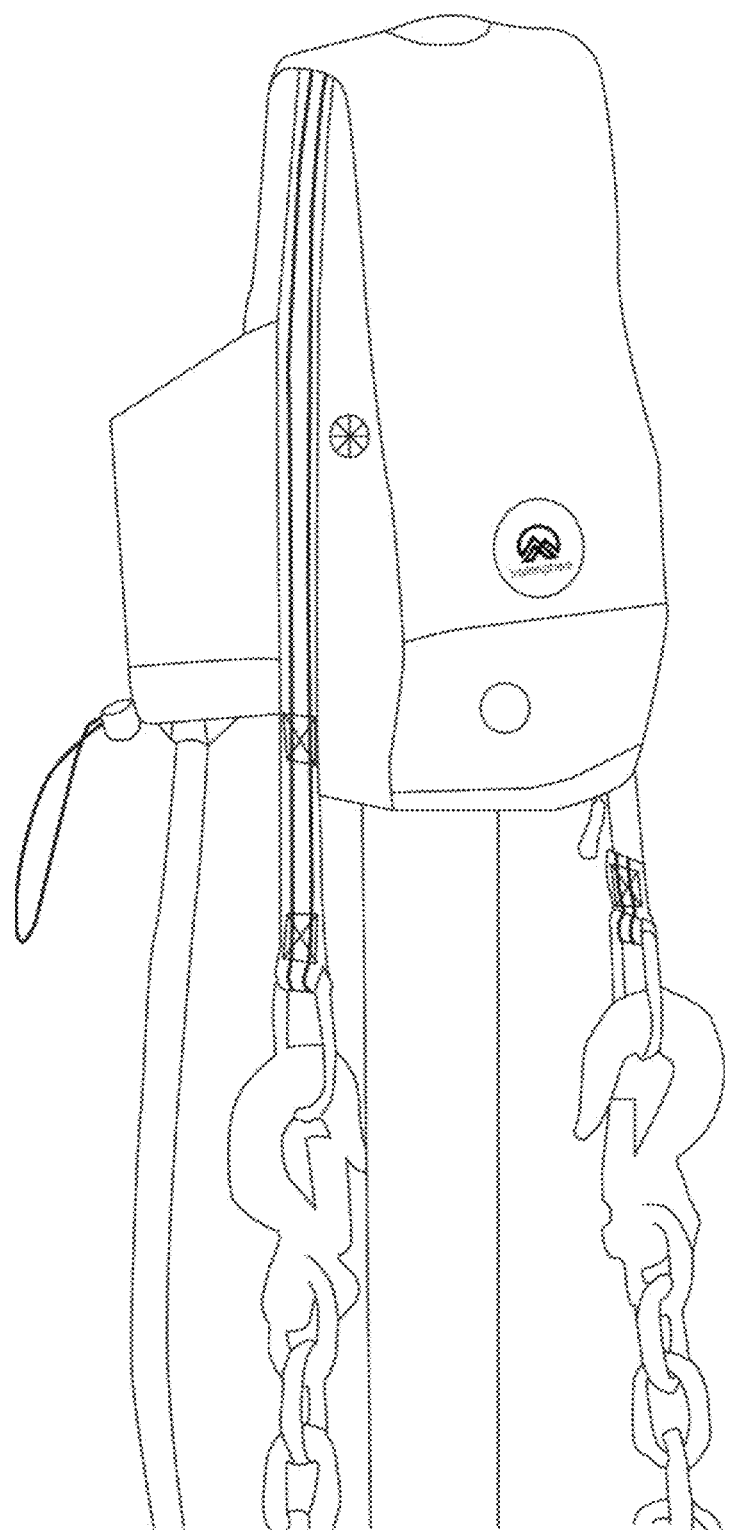
Figure 38:
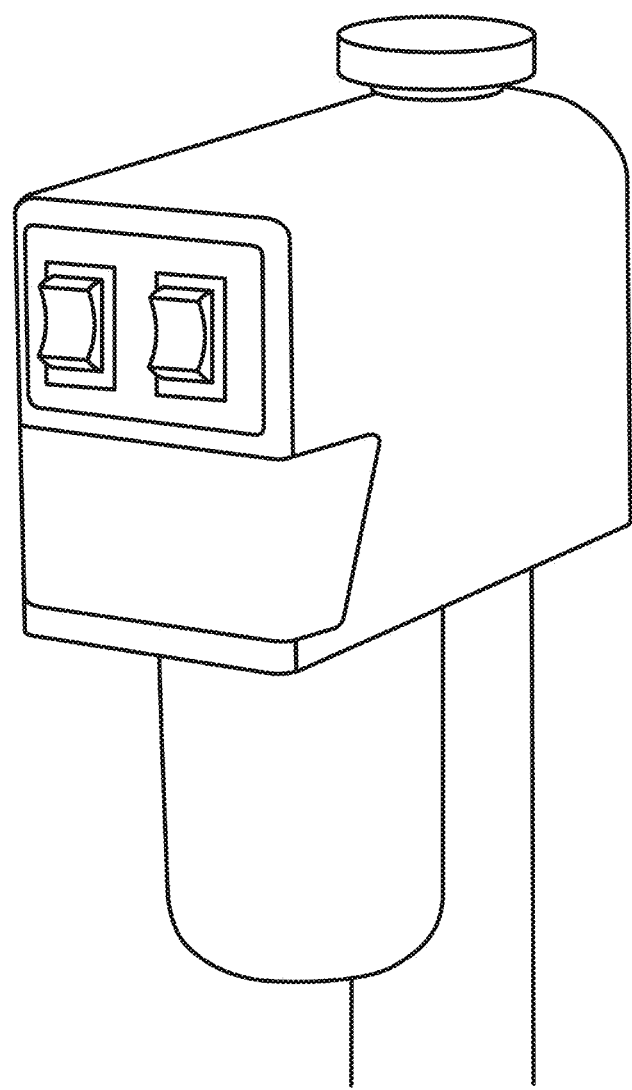
FIG. 38 illustrates Ram Jack trailer tongue jack.
Figure 39:
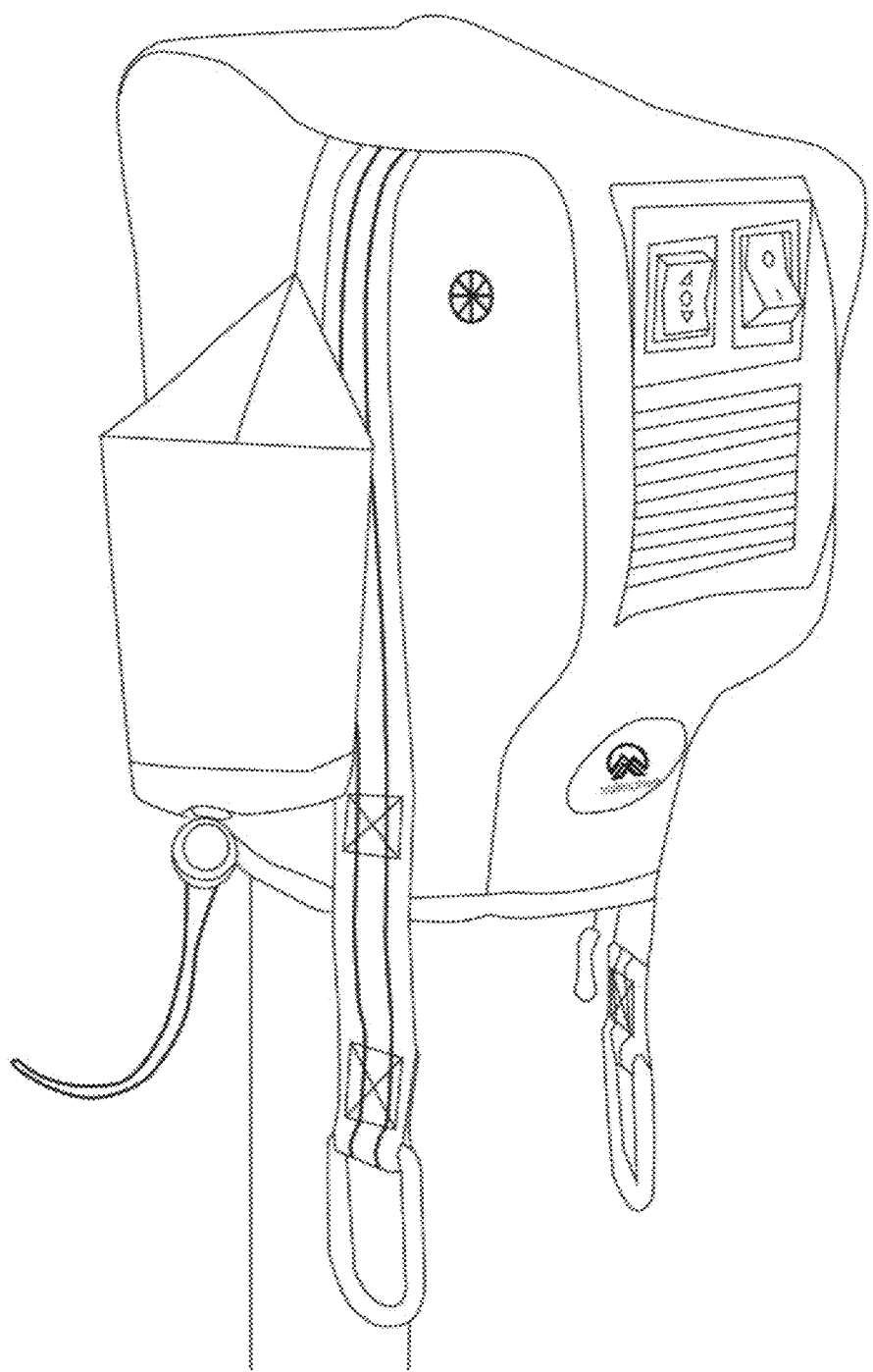
FIGS. 39-42 illustrate another embodiment of a protective cover/organizer suitable for use with the trailer tongue jack shown in FIG. 38 according to some inventive principles of this patent disclosure.
Figure 40:
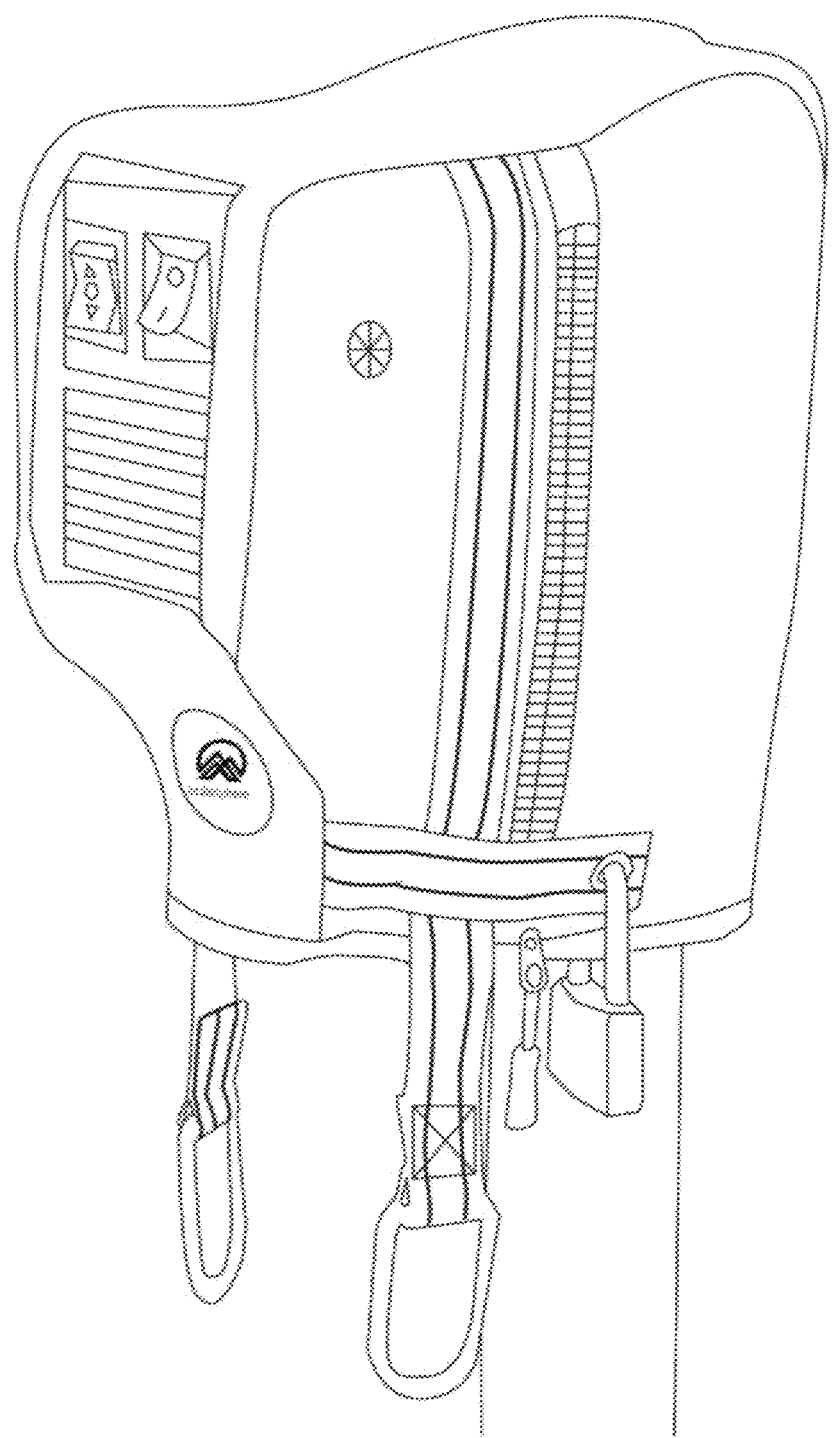
Figure 41:
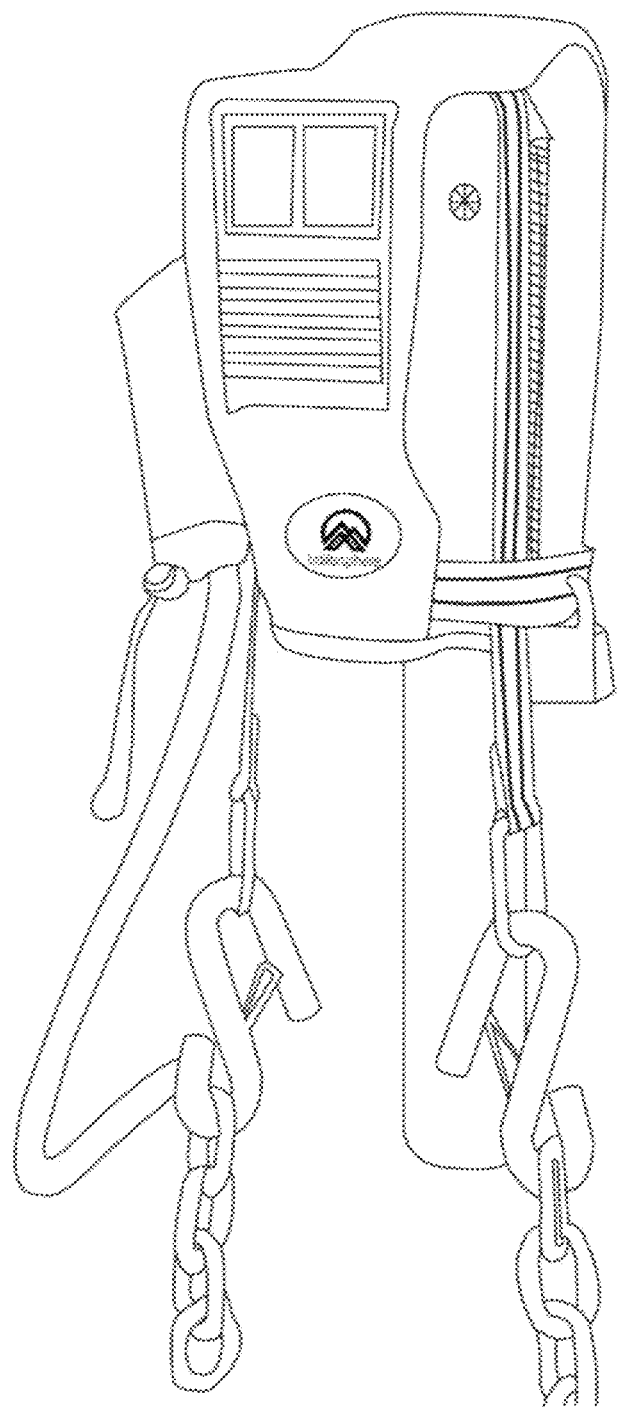
Figure 42:
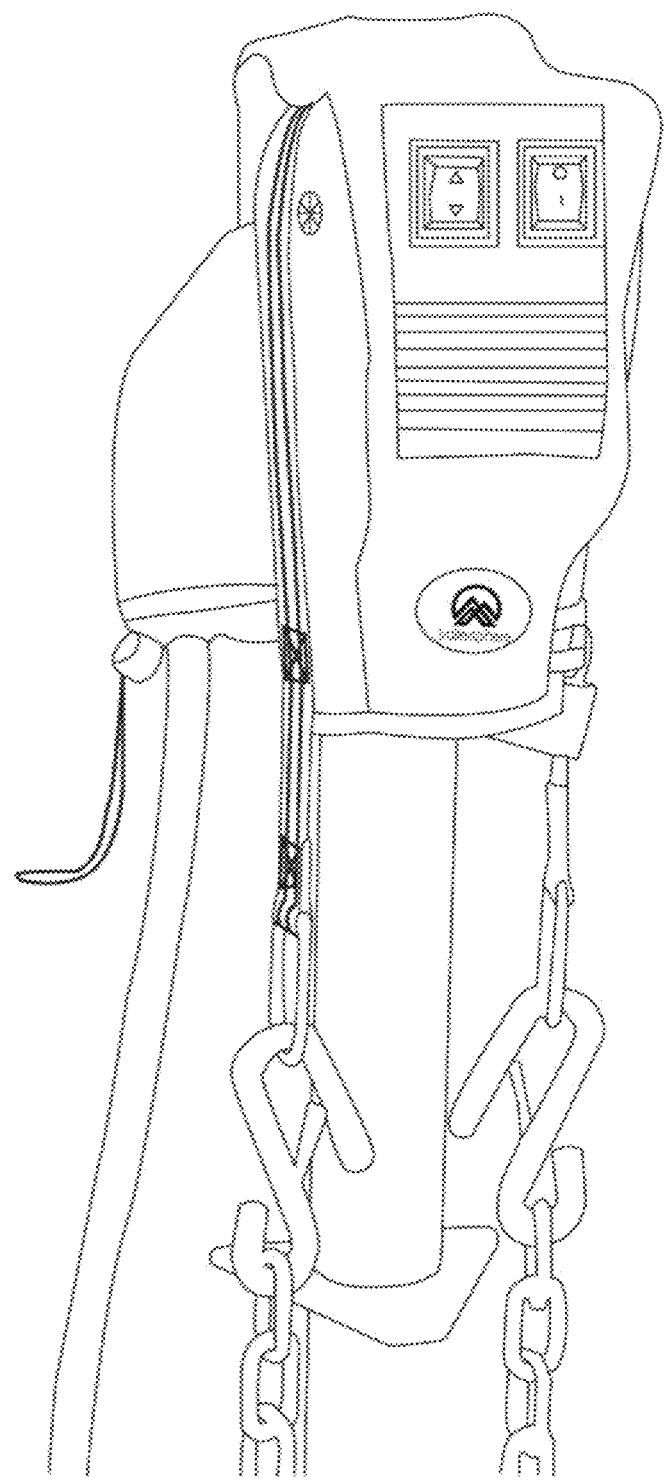
Figure 43:
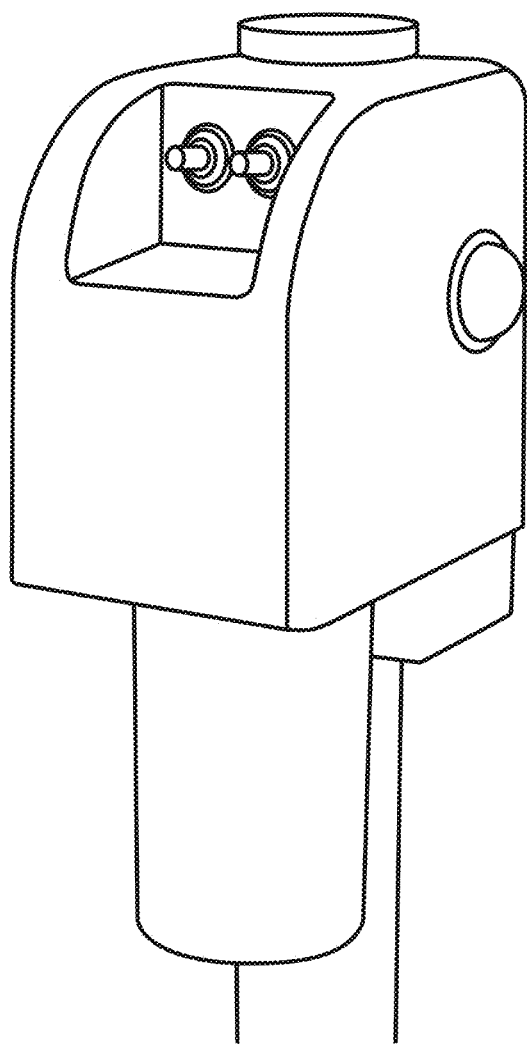
FIG. 43 illustrates Stromberg Carlson trailer tongue jack.
Figure 44:
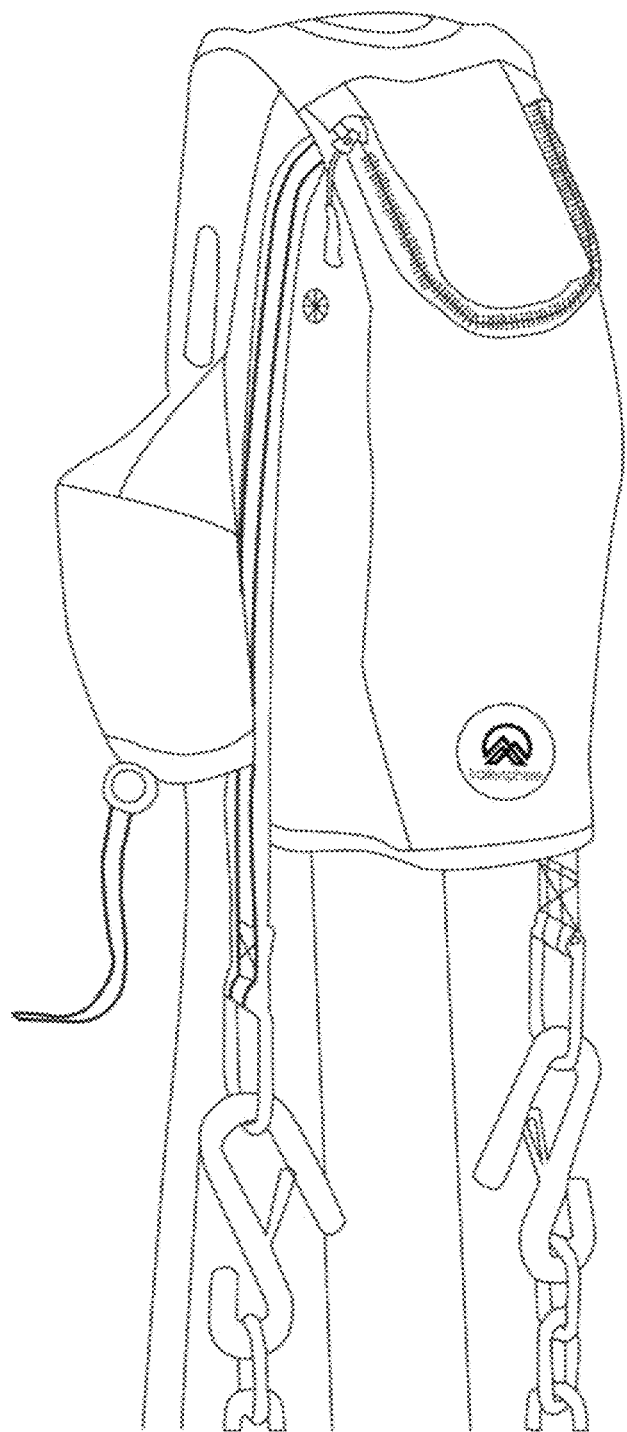
FIGS. 44-45 illustrate another embodiment of a protective cover/organizer suitable for use with the trailer tongue jack shown in FIG. 43, including a zippered access port for accessing toggle switches on the jack according to some inventive principles of this patent disclosure.
Figure 45:
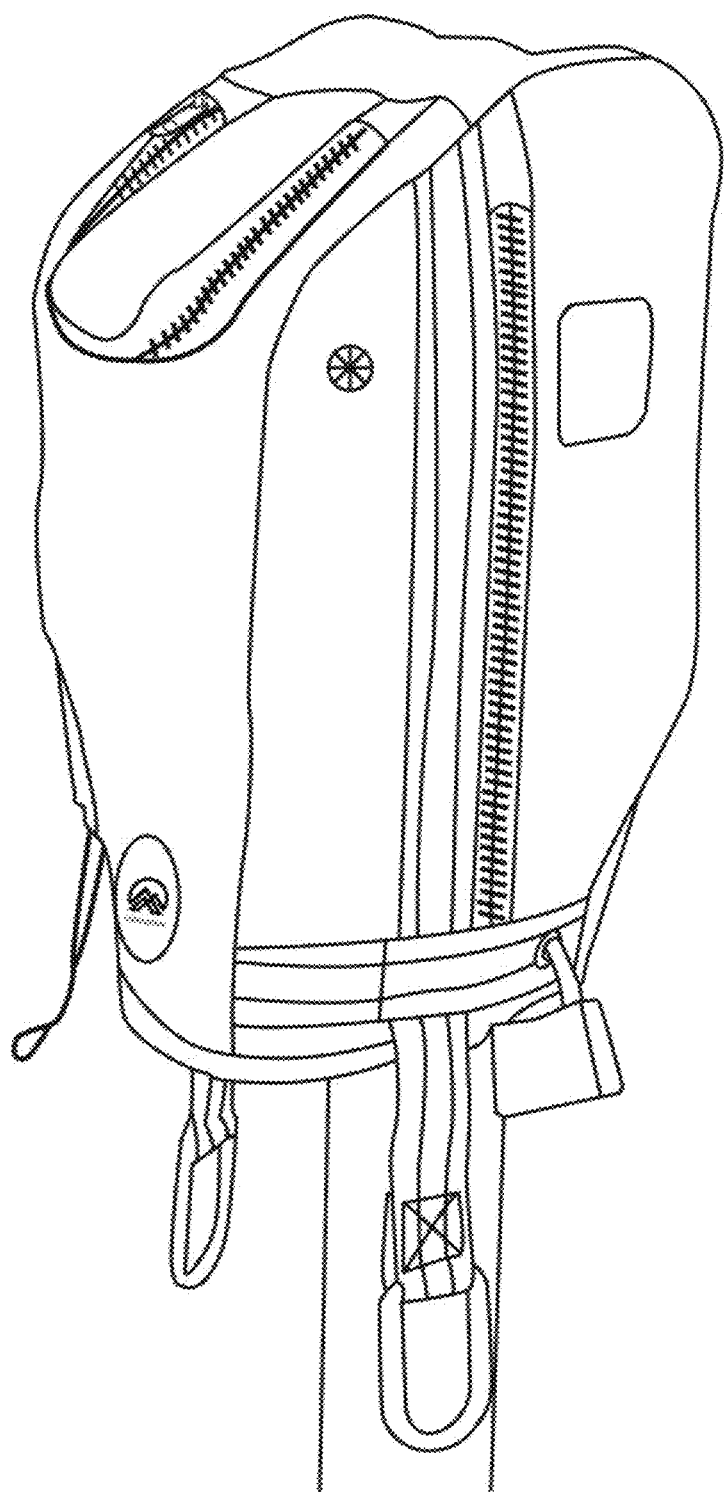

FIG. 16 illustrates how a strap for a D-ring may be snapped to a protective cover to store the D-ring while it is not in use according to the inventive principles of this patent disclosure. The view of FIG. 16 also illustrates how the strap for the lock interface crosses over the zipper to prevent the zipper from being opened while the lock, the hasp of which is visible, is attached to the cover.

In some embodiments the cover is customized for each specific model of power tongue jack model, creating a glove like fit. The cover may be form fitting onto the existing body of the tongue jack shape with some space to allow the material to extract and contract while allowing for breathability to avoid moisture traps.

In other embodiments, a cover may be designed as a universal cover to accommodate less common models of jack or to reduce dealer inventory, etc.

In some embodiments, the plug/harness holder may be integral with protective cover, for example, by including a drawstring around the column opening so the harness plug can simply be placed inside the protective cover and held in place by tightening the drawstring. In some embodiments, the plug/harness holder may be omitted.

In some embodiments that are intended as organizers only, the cover may be eliminated, and a clamp, bracket, or other attachment device can be attached to a jack column above the tongue. The attachment device can have one or more loops, clips or other attachment points to keep chains, cables, harnesses, etc. off the ground when not in use.

According to some additional inventive principles of this patent disclosure, a method may include: placing a protective cover over the head of a trailer tongue jack; connecting a first hook from a first trailer safety chain to the protective cover; and securing a plug from a trailer wiring harness to the protective cover. The method may further include connecting a second hook from a second trailer safety chain to the protective cover. Placing the protective cover over the head of the trailer tongue jack may include: expanding an opening in the protective cover to enable the protective cover to fit over the head of the trailer tongue jack; and narrowing the opening in the protective cover to cause the protective cover to fit snugly over the head of the trailer tongue jack. Connecting the first hook from the first trailer safety chain to the protective cover may include connecting the first hook to a loop attached to the protective cover. Securing the plug from the trailer wiring harness to the protective cover may include inserting the plug in a pouch, and cinching a drawstring on the pouch. The method may further include aligning an access port on the protective cover with a user interface on the trailer tongue jack.

According to some additional inventive principles, a protective apparatus for a trailer tongue jack having a head and a column may include: a protective cover having an opening to accommodate the column when the protective cover is placed on the jack; a chain holder adapted to hold a trailer safety chain when the chain is not in use; and a harness holder adapted to hold a trailer wiring harness when the harness is not in use. The protective cover may have a shape that substantially conforms to the shape of the head when the protective cover is placed on the jack. The protective cover may include an access port that aligns with a user interface on the jack when the protective cover is placed on the head. The apparatus may further include a second chain holder adapted to hold a second trailer safety chain when the second chain is not in use. The protective cover may be adapted to cinch the opening around the column to secure the protective cover to the jack. The protective cover is adapted to cinch the opening around the column and a crank for a manually operated trailer tongue jack.

According to some additional inventive principles, a protective apparatus for a trailer tongue jack having a head and a column may include: a protective cover having a shape that substantially conforms to the shape of the head, and an opening to accommodate the column when the protective cover is placed on the jack; first and second hook holders adapted to connect hooks for first and second trailer safety chains to the protective cover when the chains are not in use; and a plug holder adapted to hold a plug for a trailer wiring harness when the harness is not in use; wherein the protective cover includes an access port that aligns with a user interface on the jack when the protective cover is placed on the jack. The first and second hook holders may be arranged to hold the hooks below the protective cover. The apparatus may further include first and second fastening devices arranged to secure the hook holders to the protective cover when the hook holders are not in use. The first and second fastening devices may include snaps. The first and second hook holders may include first, and second rings attached to the protective cover by first and second straps, respectively. The plug holder may include a pouch. The pouch may include a drawstring to secure the plug in the pouch. The access port may include a window. The window may include a flexible transparent material. The access port may include a flap. The access port may include a zipper to secure the flap when the port is not in use. The opening for the column may include an expandable portion arranged to widen the opening to facilitate placement of the protective cover over the head when expanded, and narrow the opening to hold the protective cover snugly over the head when narrowed. The expandable portion may include a zipper. The protective cover may include a lock interface to enable a lock to prevent removal of the protective cover from the jack. The lock interface may include two gromets to receive the hasp of a padlock. One of the gromets may be attached directly to the protective cover and the other gromet may be attached to the protective cover by a strap. The protective cover may further include a second access port that aligns with a second user interface on the jack when the protective cover is placed on the jack. The second access port may include a transparent material that aligns with a level on the jack. The protective cover may further include a second access port that aligns with a manual actuator on the jack when the protective cover is placed on the jack.

Since the inventive principles of this patent disclosure can be modified in arrangement and detail without departing from the inventive concepts, such changes and modifications are considered to fall within the scope of the following claims.

The invention claimed is:

1. A protective apparatus for a trailer tongue jack having a head and a column, the apparatus comprising:
    a protective cover having a shape that substantially conforms to the shape of the head, and an opening to accommodate the column when the protective cover is placed on the jack;
    a plug holder adapted to hold a plug for a trailer wiring harness when the harness is not in use; and
    an access port that aligns with a user interface on the jack when the protective cover is placed on the jack, wherein the access port comprises a flap;
    wherein the plug holder comprises a pouch having a closure adapted to secure the plug, the plug holder has an opening that faces downward when the protective cover is placed on the jack, and the opening is at least partially open when the closure is closed to enable a wiring harness for the plug to pass through the opening.

2. A protective apparatus for a trailer tongue jack having a head and a column, the apparatus comprising:
    a protective cover having a shape that substantially conforms to the shape of the head, and an opening to accommodate the column when the protective cover is placed on the jack;
    first and second hook holders adapted to connect hooks for first and second trailer safety chains to the protective cover when the chains are not in use;
    a plug holder adapted to hold a plug for a trailer wiring harness when the harness is not in use;
    wherein the protective cover includes an access port that aligns with a user interface on the jack when the protective cover is placed on the jack; and
    first and second fastening devices arranged to secure the hook holders to the protective cover when the hook holders are not in use, wherein the first and second fastening devices comprise snaps.

3. A protective apparatus for a trailer tongue jack having a head and a column, the apparatus comprising:
    a protective cover having a shape that substantially conforms to the shape of the head, and an opening to accommodate the column when the protective cover is placed on the jack;
    first and second hook holders adapted to connect hooks for first and second trailer safety chains to the protective cover when the chains are not in use;
    a plug holder adapted to hold a plug for a trailer wiring harness when the harness is not in use;
    wherein the protective cover includes an access port that aligns with a user interface on the jack when the protective cover is placed on the jack; and
    a second access port that aligns with a second user interface on the jack when the protective cover is placed on the jack;
    wherein the second access port comprises a transparent material that aligns with a level on the jack.

4. A protective apparatus for a trailer tongue jack having a head and a column, the apparatus comprising:
    a protective cover having a shape that substantially conforms to the shape of the head, and an opening to accommodate the column when the protective cover is placed on the jack;
    a plug holder adapted to hold a plug for a trailer wiring harness when the harness is not in use;
    a first access port that aligns with a user interface on the jack when the protective cover is placed on the jack; and
    a second access port that aligns with a manual actuator on the jack when the protective cover is placed on the jack;
    wherein the plug holder comprises a pouch having a closure adapted to secure the plug, the plug holder has an opening that faces downward when the protective cover is placed on the jack, and the opening is at least partially open when the closure is closed to enable a wiring harness for the plug to pass through the opening.

5. A method comprising:
    placing a protective cover on a trailer tongue jack having a head and a column;
    wherein the protective cover has a shape that substantially conforms to the shape of the head, and an opening to accommodate the column when the protective cover is placed on the jack;
    wherein the protective cover comprises a plug holder adapted to hold a plug for a trailer wiring harness when the harness is not in use; and
    wherein the plug holder comprises a pouch having a closure adapted to secure the plug, the plug holder has an opening that faces downward when the protective cover is placed on the jack, and the opening is at least partially open when the closure is closed to enable a wiring harness for the plug to pass through the opening.

6. The method of claim 5 wherein the opening for the column includes an expandable portion arranged to widen the opening to facilitate placement of the protective cover over the head when expanded, and narrow the opening to hold the protective cover snugly over the head when narrowed.

7. The method of claim 5 wherein the protective cover includes a lock interface to enable a lock to prevent removal of the protective cover from the jack.

8. The method of claim 7 wherein the lock interface includes two grommets to receive the hasp of a padlock.

9. The method of claim 5 wherein the closure comprises a drawstring.

* * * * *